(12) United States Patent
Rosano

(10) Patent No.: US 9,530,130 B2
(45) Date of Patent: Dec. 27, 2016

(54) SYSTEMS AND METHODS FOR CORRECTION OF INFORMATION IN CARD-NOT-PRESENT ACCOUNT-ON-FILE TRANSACTIONS

(75) Inventor: Sharon A. Rosano, New Canaan, CT (US)

(73) Assignee: MasterCard International Incorporated, Purchase, NY (US)

( * ) Notice: Subject to any disclaimer, the term of this patent is extended or adjusted under 35 U.S.C. 154(b) by 174 days.

(21) Appl. No.: 13/561,987

(22) Filed: Jul. 30, 2012

(65) Prior Publication Data

US 2014/0032409 A1  Jan. 30, 2014

(51) Int. Cl.
  *G06Q 40/00*  (2012.01)
  *G06Q 20/40*  (2012.01)
(52) U.S. Cl.
  CPC .................... *G06Q 20/401* (2013.01)
(58) Field of Classification Search
  USPC ........................................... 705/36 R, 38, 39
  See application file for complete search history.

(56) References Cited

U.S. PATENT DOCUMENTS

| | | |
|---|---|---|
| 4,114,027 A | 9/1978 | Slater et al. |
| 5,679,938 A | 10/1997 | Templeton et al. |
| 5,679,940 A | 10/1997 | Templeton et al. |
| 6,205,437 B1 | 3/2001 | Gifford |
| 6,327,578 B1 | 12/2001 | Linchan |
| 6,915,279 B2 | 7/2005 | Hogan et al. |
| 6,980,968 B1 | 12/2005 | Walker et al. |
| 7,035,872 B2 | 4/2006 | Phillips et al. |
| 7,249,062 B2 | 7/2007 | Norins, Jr. et al. |
| 7,292,999 B2 | 11/2007 | Hobson et al. |
| 7,958,050 B2 | 6/2011 | Finch |
| 7,970,705 B2 | 6/2011 | Patterson |
| 7,987,138 B2 | 7/2011 | Patterson |

(Continued)

OTHER PUBLICATIONS

Dictionary of Computer, Information Processing, and Telecommucations; 2nd ed. by Rosenberg, PH D; John Wiley & Sons; New York; pp. 3.

(Continued)

*Primary Examiner* — Olabode Akintola
(74) *Attorney, Agent, or Firm* — Armstrong Teasdale LLP

(57) ABSTRACT

In one aspect, a method for processing a card-not-present account-on-file transaction is provided. The transaction involves a cardholder using payment card information stored by a merchant. The method includes receiving an authorization request message for the transaction, the authorization request message received at a payment network from an acquirer associated with the merchant and receiving an authorization response message, the authorization response message received at the payment network from an issuer. The authorization response includes a denial indicator indicating that the transaction has been denied. The method further includes querying a database coupled to the payment network to determine whether the database includes updated payment card information for a payment card associated with the transaction. The method additionally includes transmitting the updated payment card information associated with the payment card account identifier associated with the transaction to the acquirer for the acquirer to communicate to the merchant.

25 Claims, 14 Drawing Sheets

(56) References Cited

U.S. PATENT DOCUMENTS

| | | |
|---|---|---|
| 8,036,963 B2 | 10/2011 | Carroll et al. |
| 8,095,464 B2 | 1/2012 | Patterson et al. |
| 2002/0004770 A1 | 1/2002 | Phillips et al. |
| 2003/0050880 A1 | 3/2003 | Degen et al. |
| 2003/0135470 A1* | 7/2003 | Beard .............. G06Q 20/04 705/67 |
| 2005/0075977 A1 | 4/2005 | Carroll et al. |
| 2005/0234820 A1 | 10/2005 | MacKouse |
| 2005/0278188 A1 | 12/2005 | Thomson et al. |
| 2006/0122932 A1 | 6/2006 | Birtwell et al. |
| 2006/0131395 A1 | 6/2006 | Potts et al. |
| 2006/0136317 A1* | 6/2006 | Mizrah .................. 705/35 |
| 2007/0083465 A1 | 4/2007 | Ciurea et al. |
| 2007/0194882 A1 | 8/2007 | Yokota et al. |
| 2008/0046364 A1 | 2/2008 | Hall et al. |
| 2008/0133351 A1 | 6/2008 | White et al. |
| 2008/0301050 A1* | 12/2008 | DiGioacchino ....... G06Q 20/04 705/44 |
| 2009/0171839 A1* | 7/2009 | Rosano et al. .......... 705/40 |
| 2010/0174644 A1 | 7/2010 | Rosano et al. |
| 2010/0228671 A1 | 9/2010 | Patterson |
| 2010/0299254 A1 | 11/2010 | Patterson |
| 2010/0312700 A1* | 12/2010 | Coulter .............. G06Q 20/02 705/42 |
| 2011/0231312 A1 | 9/2011 | Finch |
| 2011/0295743 A1 | 12/2011 | Patterson |
| 2012/0036052 A1 | 2/2012 | Carroll et al. |
| 2012/0197802 A1* | 8/2012 | Smith et al. .............. 705/44 |

OTHER PUBLICATIONS

International Search Report and Written Opinion for PCT/US2013/050321 dated Sep. 27, 2013; 11 pages.

Visa Directions; Spring 2007 by Visa USA 2007; 24 pages; usa.visa.com/download/ .. ./visa_risk_management_guide_ecommerce.pdf.

Master's Thesis: Credit Card Security and E-Payment by Jithendra Dara et al; 2006, 23, ISSN: 1653-01870 ISRN: LTU-PB-EX 06/23-SE; 50 pages.

Orbital Gateway Web Services Interface Specification: by Orbital Gateway Interface Specification; Dec. 2006; p. 16.

* cited by examiner

SYSTEMS AND METHODS FOR CORRECTION OF INFORMATION IN CARD-NOT-PRESENT ACCOUNT-ON-FILE TRANSACTIONS

BACKGROUND OF THE INVENTION

The field of the invention relates generally to systems and methods for processing payment transactions and, more particularly, to systems and methods for processing account-on-file transactions that include automatically notifying an acquirer bank of an updated payment card number or expiration date after a corresponding denial indicator is sent from an issuer bank in transactions in which the payment card itself is not present.

The payment card industry includes payment transactions wherein a payment cardholder makes a purchase, but the physical payment card is not present. These transactions are known as "card-not-present" (CNP) transactions. In such transactions, information regarding the payment card, including an account number and, in many instances, an expiration date for the payment card is transmitted from a merchant, along with an indicator that the transaction is a CNP transaction. An "account-on-file" transaction is a type of transaction in which the merchant stores information regarding the cardholder's payment card in a database, then retrieves the stored payment card information and includes it in at least one authorization request. One specific type of account-on-file transaction is a "recurring payment transaction", which a merchant initiates on a recurring basis for a particular cardholder. In such recurring payment transactions, the merchant stores information regarding the cardholder's payment card in a database, then retrieves the stored payment card information and includes it in each recurring authorization request.

An example is a gym membership. Rather than mailing a monthly check for membership with a gym, a cardholder might choose to register a payment card, such as a credit card, a debit card, or a prepaid card, with the gym. Registering the payment card with the gym enables the gym to automatically charge the payment card for the monthly dues on a particular day each month. In some such systems, the merchant stores an account number, an expiration date, and/or other information associated with the payment card and/or cardholder. Given the convenience of this payment model for both merchants and cardholders, it finds use in many other scenarios where a cardholder is a member of a club or subscriber of products or services. Accordingly, multiple merchants may have stored payment card information for the same cardholder. Likewise, any given merchant may have stored payment card information for multiple cardholders.

A downside, however, is that information regarding a payment card is subject to change. For example a cardholder's payment card might be lost or stolen. In other instances, a data security breach might occur that necessitates reissuing payment cards with different card numbers to customers of an issuer. In other instances, a payment card might expire, causing a new payment card to be issued with a new expiration date. In yet other instances, a payment card account might be closed. When such information changes, an authorization request containing the old information is denied by the issuer of the payment card. As a result, the merchant who originally submitted the authorization request is prevented from successfully obtaining payment until the merchant acquires the updated payment card information. Due to wide adoption of the account-on-file payment model by merchants and cardholders, it is understandably difficult for a cardholder to update each merchant with new payment card information. Likewise, it reduces the benefits of the account-on-file payment model to require a merchant to inquire with each cardholder for updated payment card information prior to submitting each payment authorization request. Accordingly, improvements are desired.

BRIEF DESCRIPTION OF THE INVENTION

In one aspect, a method for processing a card-not-present account-on-file transaction is provided. The transaction is made by a cardholder using payment card information stored by a merchant. The method is performed using a computer device coupled to a database. The payment card information includes a payment card account identifier. The method includes receiving an authorization request message for the transaction, the authorization request message received at the computer device from an acquirer associated with the merchant. The method further includes receiving an authorization response message, the authorization response message received at the computer device from an issuer, the authorization response including a denial indicator indicating that the transaction has been denied. The method further includes querying the database coupled to the computer device to determine whether the database includes updated payment card information associated with the payment card account identifier associated with the transaction. The method further includes transmitting the updated payment card information associated with the payment card account identifier associated with the transaction to the acquirer for the acquirer to communicate to the merchant.

In another aspect, a network-based system for processing a card-not-present account-on-file transaction is provided. The transaction is made by a cardholder using payment card information stored by a merchant. The payment card information includes a payment card account identifier. The system includes a payment network, a payment database for storing updated information for the payment card, and a payment network server. The payment network communicatively couples the payment database with the payment network server. The payment network server is configured to receive a first authorization request message for the transaction, the first authorization request received from an acquirer computer. The payment network server is further configured to receive an authorization response message, the authorization response message received from an issuer, the authorization response including a denial indicator indicating that the transaction has been denied. The payment network server is further configured to query the payment database to determine whether the payment database includes updated payment card information associated with the payment card account identifier associated with the transaction. The payment network server is further configured to transmit the updated payment card information associated with the payment card account identifier associated with the transaction to the acquirer computer for the acquirer computer to communicate to the merchant computer.

In a further aspect, a computer coupled to a database for processing a card-not-present account-on-file transaction is provided. The transaction is made by a cardholder using payment card information stored by a merchant. The payment card information includes a payment card account identifier. The computer is programmed to receive an authorization request message for the transaction, the authorization request message received from an acquirer associated with the merchant. The computer is further programmed to receive an authorization response message, the authorization response message received from an issuer, the authorization response including a denial indicator indicating that the transaction has been denied. The computer is further programmed to query the database to determine whether the database includes updated payment card information for a payment card account identifier associated with the transaction. The computer is further programmed to transmit the updated payment card information associated with the payment card account identifier associated with the transaction to the acquirer for the acquirer to communicate to the merchant.

In another aspect, a non-transitory computer readable storage medium storing computer-executable instructions thereon for processing a card-not-present account-on-file transaction is provided. The transaction is made by a cardholder using payment card information stored by a merchant. The payment card information includes a payment card account identifier. When executed by a computer coupled to a database, the computer-executable instructions cause the computer to receive an authorization request message for the transaction, the authorization request message received from an acquirer associated with the merchant. The computer-executable instructions further cause the computer to receive an authorization response message, the authorization response message received from an issuer, the authorization response including a denial indicator indicating that the transaction has been denied. The computer-executable instructions further cause the computer to query the database to determine whether the database includes updated payment card information for a payment card account identifier associated with the transaction. The computer-executable instructions further cause the computer to transmit the updated payment card information associated with the payment card account identifier associated with the transaction to the acquirer for the acquirer to communicate to the merchant.

In another aspect, a method for processing a card-not-present account-on-file transaction over a computer device coupled to a database is provided. The card-not-present account-on-file transaction has a first transaction date. The transaction is made by a cardholder using payment card information stored by a merchant. The payment card information includes a payment card number. The method includes receiving a first authorization request message for the transaction, the first authorization request message received at the computer device from an acquirer associated with the merchant. The method further includes determining that the first authorization request message is associated with a card-not-present account-on-file transaction based on a first flag present in the first authorization request message. The method further includes identifying a first expiration date included in the authorization request message for the payment card number used for the transaction. The method further includes querying the database to determine if a second expiration date associated with the payment card number is stored therein, the second expiration date being later than the first expiration date. The method further includes modifying the authorization request message at the computer device by replacing the first expiration date with the second expiration date. The method further includes transmitting the authorization request message to an issuer associated with the payment card.

In another aspect, a network-based system for processing a card-not-present account-on-file transaction having a first transaction date is provided. The transaction is made by a cardholder using payment card information stored by a merchant. The payment card information includes a payment card number. The system includes a payment network, a payment database for storing information for the payment card, and a payment network server, wherein said payment network communicatively couples the payment database with the payment network server. The payment network server is configured to receive a first authorization request message for the transaction, the first authorization request message received from an acquirer associated with the merchant. The payment network server is further configured to determine that the first authorization request message is associated with a card-not-present account-on-file transaction based on a first flag present in the first authorization request message. The payment network server is further configured to identify a first expiration date included in the authorization request message for the payment card number used for the transaction. The payment network server is further configured to query the payment database to determine if a second expiration date associated with the payment card number is stored therein, the second expiration date being later than the first expiration date. The payment network server is further configured to modify the authorization request message by replacing the first expiration date with the second expiration date. The payment network server is further configured to transmit the authorization request message to an issuer associated with the payment card.

In a further aspect, a computer coupled to a database for processing a card-not-present account-on-file transaction having a first transaction date is provided. The transaction is made by a cardholder using payment card information stored by a merchant. The payment card information includes a payment card number. The computer is programmed to receive a first authorization request message for the transaction, the first authorization request message received from an acquirer associated with the merchant. The computer is further programmed to determine that the first authorization request message is associated with a card-not-present account-on-file transaction based on a first flag present in the first authorization request message. The computer is further programmed to identify a first expiration date included in the authorization request message for the payment card number used for the transaction. The computer is further programmed to query the database to determine if a second expiration date associated with the payment card number is stored therein, the second expiration date being later than the first expiration date. The computer is further programmed to modify the authorization request message by replacing the first expiration date with the second expiration date. The computer is further programmed to transmit the authorization request message to an issuer associated with the payment card.

In yet another aspect, a non-transitory computer readable storage medium storing computer-executable instructions thereon for processing a card-not-present account-on-file transaction having a first transaction date is provided. The transaction is made by a cardholder using payment card information stored by a merchant. The payment card information includes a payment card number. When executed by a computer coupled to a database, the computer-executable instructions cause the computer to receive a first authorization request message for the transaction, the first authorization request message received from an acquirer associated with the merchant. The computer-executable instructions further cause the computer to determine that the first authorization request message is associated with a card-notpresent account-on-file transaction based on a first flag present in the first authorization request message. The computer-executable instructions further cause the computer to identify a first expiration date included in the authorization request message for the payment card number used for the transaction. The computer-executable instructions further cause the computer to query the database to determine if a second expiration date associated with the payment card number is stored therein, the second expiration date being later than the first expiration date. The computer-executable instructions further cause the computer to modify the authorization request message by replacing the first expiration date with the second expiration date. The computer-executable instructions further cause the computer to transmit the authorization request message to an issuer associated with the payment card.

BRIEF DESCRIPTION OF THE DRAWINGS

FIG. 1 is a simplified block diagram of a conventional billing update process.

FIG. 2 is a simplified block diagram of a server architecture of a system.

FIG. 3 is an expanded block diagram of the server architecture.

FIG. 4 illustrates a configuration of a cardholder computer device operated by a cardholder.

FIG. 5 illustrates a configuration of a server computer device such as the server system shown in FIGS. 2 and 3.

FIG. 6 is a flowchart of a method that may be implemented in the system shown in FIG. 3 to process an account-on-file transaction.

FIG. 7 is a flowchart of a method that may be implemented to provide updated payment card information.

FIG. 8 is a schematic diagram illustrating a multi-party payment card industry system for enabling ordinary payment-by-card transactions in which merchants and card issuers do not necessarily have a one-to-one relationship.

FIG. 9 is a simplified block diagram of a server architecture of a system.

FIG. 10 is an expanded block diagram of a server architecture of the system.

FIG. 11 illustrates a configuration of a cardholder computer device operated by a cardholder.

FIG. 12 illustrates a configuration of a server computer device such as the server system shown in FIGS. 9 and 10.

FIG. 13 is a flowchart of a method that may be implemented in the system shown in FIG. 10 to process a payment transaction in which a payment card is present at a point of interaction.

FIG. 14 is a flowchart of a method that may be implemented to correct an outdated payment card expiration date used in a transaction.

DETAILED DESCRIPTION OF THE INVENTION

Figure 1:
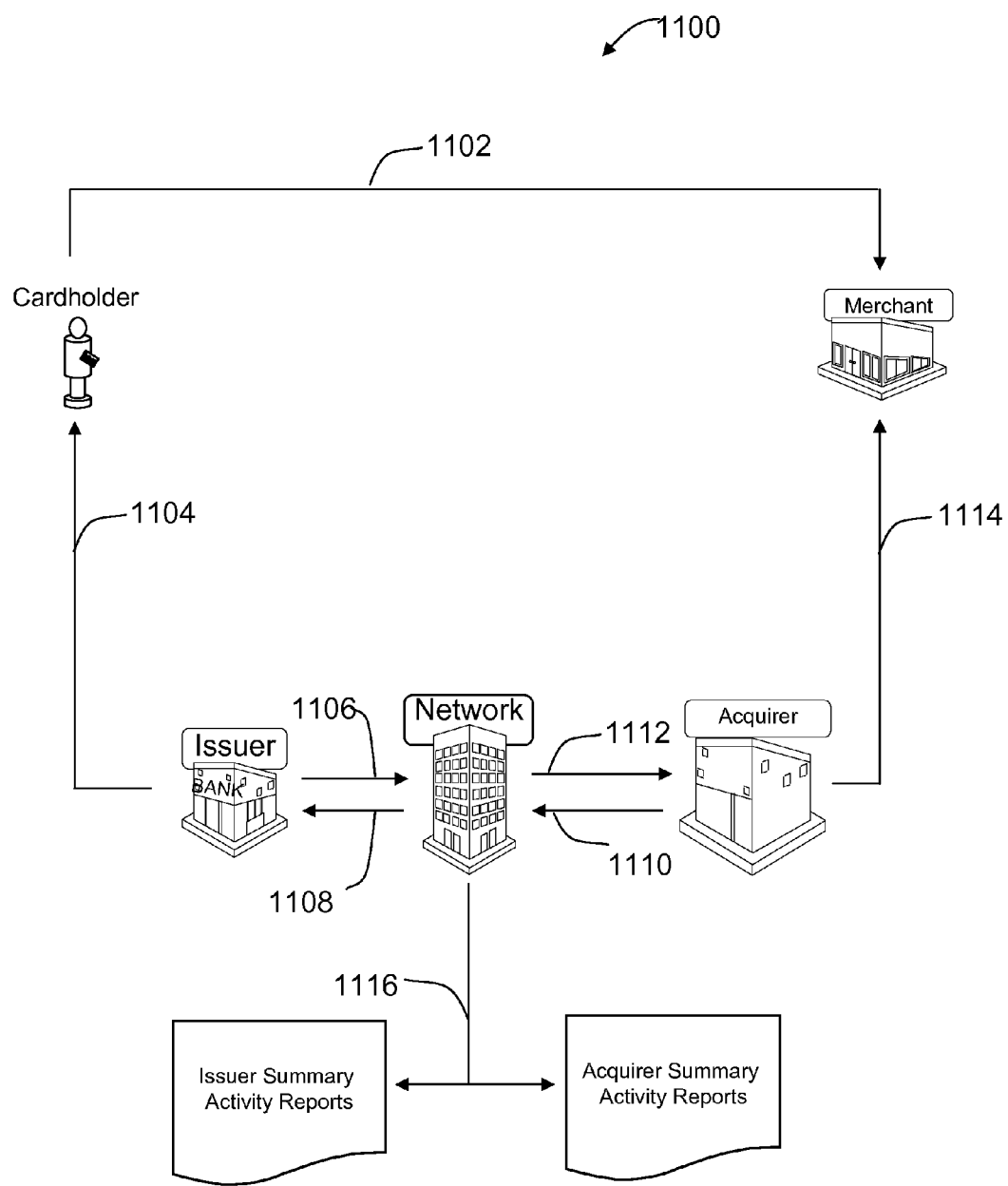
FIGS. 1-7 pertain to a first set of embodiments of the present invention.

The following description pertains to a first set of embodiments of the present invention.

As used herein, an acquiring bank, or acquirer, is typically a bank at which a merchant holds an account. Further, an issuing bank, or issuer, is typically a bank at which a customer, or cardholder, holds an account. The account may be debited or charged through the use of a debit card, a credit card, or another type of transaction card, as described herein.

As used herein, a processor may include any programmable system including systems using microcontrollers, reduced instruction set circuits (RISC), application specific integrated circuits (ASICs), logic circuits, and any other circuit or processor capable of executing the functions described herein. The above examples are exemplary only, and thus are not intended to limit the definition and/or meaning of the term "processor" in any way.

Described in detail herein are exemplary embodiments of systems and methods that facilitate correcting payment card information stored by a merchant for use in account-on-file transactions in which a card is not presented to the merchant. Such transactions are also called card-not-present account-on-file transactions. The systems and methods facilitate, for example, transferring new payment card information electronically over a network to an acquirer for a particular merchant who is conducting card-not-present account-on-file transactions. That is, if a card-not-present account-on-file authorization request message from a merchant is denied by an issuer, certain systems and methods according to the present invention facilitate detecting why the authorization request was denied. If the denial pertains to outdated payment card information included in the authorization request message, for example, due to a change in payment card status and/or the issuance of a new payment card to the cardholder from the issuing bank, certain systems and methods according to the present invention facilitate sending updated payment card information to the acquirer, to then be communicated to the merchant. The merchant may then resubmit the transaction using the updated payment card information. In alternative embodiments, the payment network server generates and transmits a subsequent authorization request message to the issuer on behalf of the merchant, without the merchant or acquirer taking steps to initiate a subsequent transaction with the updated payment card information. The subsequent authorization request message generated and transmitted by the payment network server in such alternative embodiments includes the updated payment card information.

A technical effect of the systems and methods described herein include at least one of (a) creating an authentication request message that includes payment card information stored by a merchant and transmitting the authorization request from an acquirer to a computer device coupled to a database; (b) identifying the authorization request as a card-not-present account-on-file transaction by reading a flag signifying such; (c) storing the authorization request message in the database; (d) transmitting the authorization request message to an issuer; (e) receiving an authorization response message from the issuer, wherein the authorization response message includes a denial indicator; (f) storing the authorization response message, including the denial indicator, in the database; (g) determining that the database includes new or updated payment card information associated with the payment card account identifier associated with the card-not-present account-on-file transaction; (h) detecting that the acquirer has authenticated to the computer; and (i) transmitting new or updated payment card information associated with the payment card account identifier associated with the card-not-present account-on-file transaction to the acquirer.

In one embodiment, computer-executable instructions are provided and are embodied on a non-transitory computer readable storage medium. The computer-executable instructions cause a computer executing the instructions to utilize a Structured Query Language (SQL) with a client user interface front-end for administration and a web interface for standard user inputs and reports. In an exemplary embodiment, the system is web-enabled and is run on a business entity intranet. In an alternative embodiment, the system is fully accessible by individuals having authorized access from outside a firewall of the business-entity through the Internet. In a further alternative embodiment, the system is run in a Windows® environment (Windows is a registered trademark of Microsoft Corporation, Redmond, Wash.). The application is flexible and designed to run in various different environments without compromising any major functionality.

FIG. 1 is a flowchart 1100 illustrating a conventional billing update process. The process begins when a cardholder establishes 1102 an account-on-file payment relationship with a merchant. The cardholder provides payment card information to the merchant, thereby enabling the merchant to periodically charge the cardholder for a product or service by automatically charging the payment card on file. For example, the cardholder enters the payment card information into a web browser and submits the payment card information to the merchant. Thereafter, the merchant stores the payment card information in a database and/or server. The payment card information used by the merchant may include the cardholder's name as it appears on the payment card, a billing address, an account number or card number of the payment card, and/or an expiration date of the payment card.

At some point after the cardholder establishes 1102 the account-on-file relationship with the merchant, an issuing bank, or issuer, sends 1104 the cardholder a replacement payment card or may change one or more piece of payment card information, such as the expiration date. This may be due to a loss of the payment card by the cardholder or a reissue of a payment card due to security reasons and/or due to the passage of the payment card expiration date. In such a case, the new payment card information is not on file with the merchant. Accordingly, when the merchant attempts to charge the cardholder using the payment card information stored by the merchant, the transaction is at risk of being denied due to the outdated payment card information. To prevent a denial, the issuer may be enrolled in a payment card information update service that uses a MasterCard® interchange network (MasterCard International Incorporated, Purchase, N.Y.). The MasterCard® interchange network, which is an example of a payment network, is a proprietary communications standard promulgated by MasterCard International Incorporated® for the exchange of financial transaction data between financial institutions that are members of MasterCard International Incorporated®. The issuer sends 1106 updated payment card information to the payment network, which stores 1108 the updated payment card information.

Acquiring banks, or acquirers, may also enroll in such an update service in order to collect updated payment card information and to pass the updated payment card information to merchants. For example, an acquirer may periodically query 1110 the payment network for information regarding payment cards. The payment network determines 1112 whether there exists updated payment card information and, if so, sends the updated information to the acquirer. The acquirer then sends 1114 the updated payment card information to the merchant and the merchant updates the outdated payment card information. Additionally, such a process includes a periodic report 1116 of updated payment card information that is sent to acquirers and issuers.

Financial transaction cards, or payment cards, may refer to credit cards, debit cards, and prepaid cards. These cards may all be used as a method of payment for performing a transaction, such as a recurring transaction. As described herein, the term "financial transaction card" or "payment card" includes cards such as credit cards, debit cards, and prepaid cards. Also included is any other device that may hold payment account information for use in recurring transactions, such as mobile phones, personal digital assistants (PDAs), and key fobs. Also included are online virtual wallets. A "payment card account identifier" as used herein is, for example, an account number or any other number, character, symbol, item, or sequence thereof that identifies an account associated with a payment card.

Figure 2:
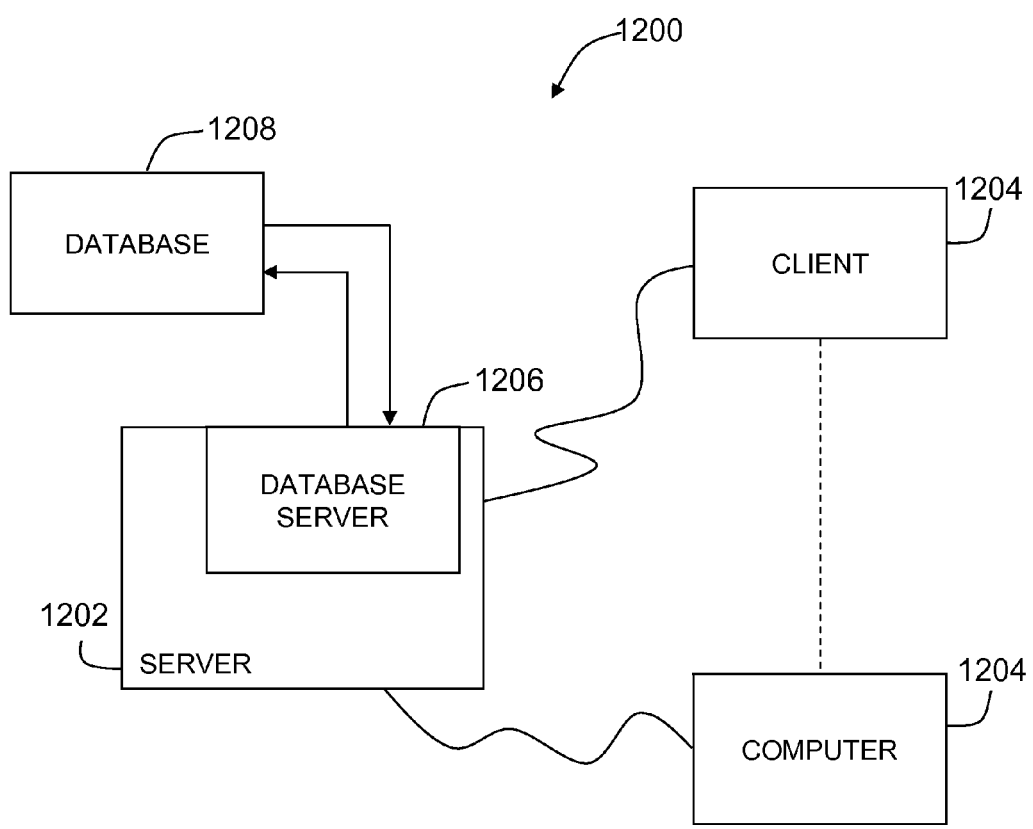

FIG. 2 is a simplified block diagram of an exemplary system 1200 in accordance with one embodiment of the present invention. In one embodiment, system 1200 is the financial transaction card payment system shown in FIG. 1, which may be utilized for processing account-on-file payments. More specifically, in the exemplary embodiment, system 1200 includes a server system 1202 and a plurality of client subsystems, also referred to as client systems 1204, connected to server system 1202. In one embodiment, client systems 1204 are computers including a web browser, such that server system 1202 is accessible to client systems 1204 using the Internet. Client systems 1204 are interconnected to the Internet through many interfaces including a network, such as a local area network (LAN) and/or a wide area network (WAN), dial-in connections, cable modems, wireless-connections, and special high-speed ISDN lines. Client systems 1204 may be any device capable of interconnecting to the Internet including a web-based phone, personal digital assistant (PDA), or other web-connectable equipment. A database server 1206 is connected to a database 1208 containing information on a variety of matters, as described below in greater detail. In one embodiment, database 1208 is stored on server system 1202 and may be accessed by potential users at one of client systems 1204 by logging onto server system 1202 through one of client systems 1204. In any alternative embodiment, database 1208 is stored remotely from server system 1202 and may be non-centralized.

As discussed below, payment card information including account numbers, payment card numbers, expiration dates, and account statuses, such as whether the account is open or closed, is stored within database 1208. Further, data relating to the cardholder of a payment card may also be stored within database 1208. Such cardholder data may include, for example, cardholder name and cardholder billing address.

Figure 3:
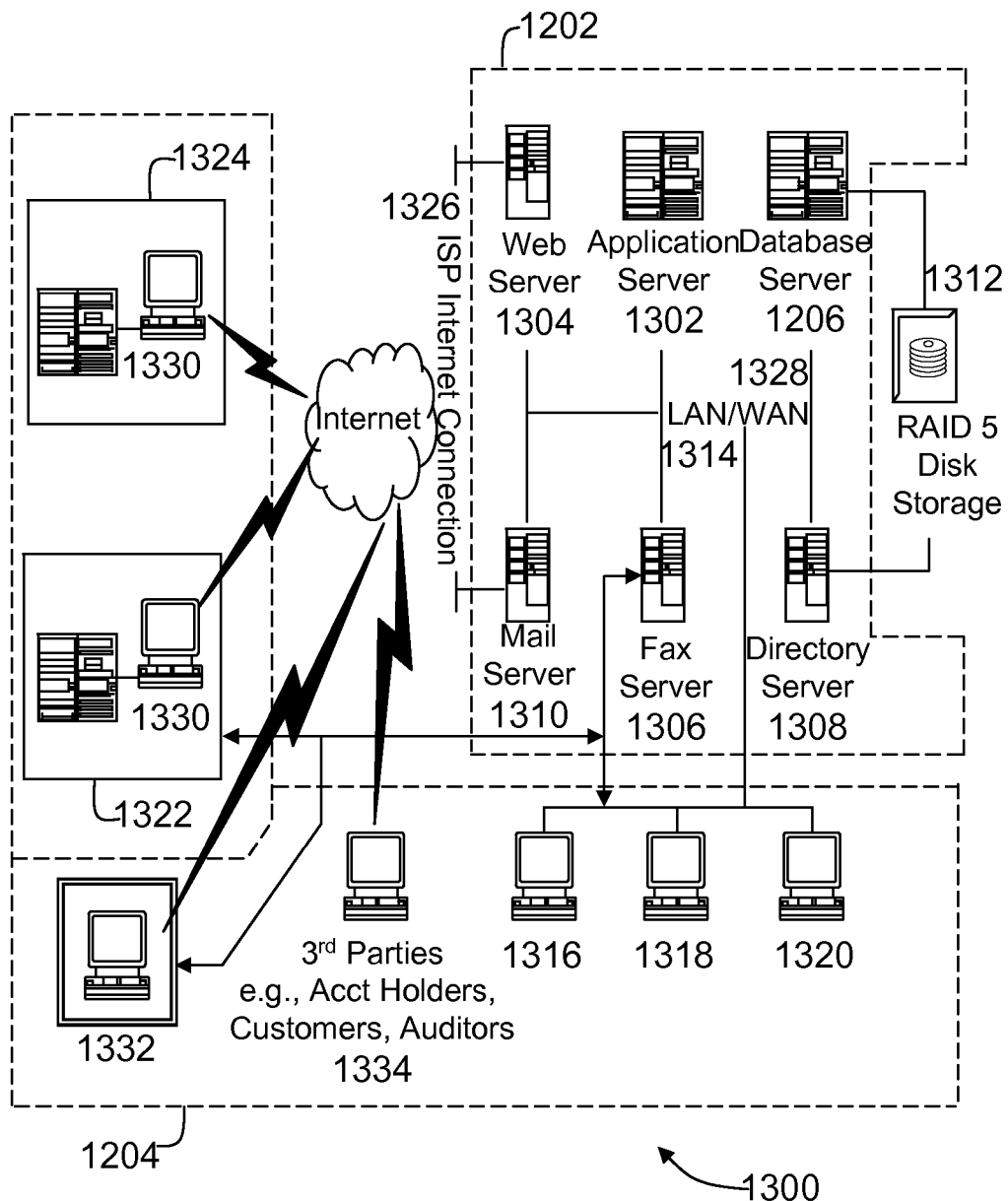

FIG. 3 is an expanded block diagram of an exemplary embodiment of a server architecture of a system 1300 in accordance with one embodiment of the present invention. Components in system 1300, identical to components of system 1200 (shown in FIG. 2), are identified in FIG. 3 using the same reference numerals used in FIG. 2. System 1300 includes server system 1202 and client systems 1204. Server system 1202 further includes database server 1206, an application server 1302, a web server 1304, a fax server 1306, a directory server 1308, and a mail server 1310. A disk storage unit 1312 is coupled to database server 1206 and directory server 1308. Servers 1206, 1302, 1304, 1306, 1308, and 1310 are coupled in a local area network (LAN) 1314. In addition, a system administrator's workstation 1316, a user workstation 1318, and a supervisor's workstation 1320 are coupled to LAN 1314. Alternatively, workstations 1316, 1318, and 1320 are coupled to LAN 1314 using an Internet link or are connected through an Intranet.

Each workstation, 1316, 1318, and 1320, is a personal computer having a web browser. Although the functions performed at the workstations typically are illustrated as being performed at respective workstations 1316, 1318, and 1320, such functions can be performed at one of many personal computers coupled to LAN 1314. Workstations 1316, 1318, and 1320 are illustrated as being associated with separate functions only to facilitate an understanding of the different types of functions that can be performed by individuals having access to LAN 1314.

Server system 1202 is configured to be communicatively coupled to various entities, including acquirers 1322 and issuers 1324, and to third parties, e.g., auditors, 1334 using an Internet connection 1326. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 1328, local area network 1314 could be used in place of WAN 1328.

In the exemplary embodiment, any authorized individual or entity having a workstation 1330 may access system 1300. At least one of the client systems includes a manager workstation 1332 located at a remote location. Workstations 1330 and 1332 are personal computers having a web browser. Also, workstations 1330 and 1332 are configured to communicate with server system 1202. Furthermore, fax server 1306 communicates with remotely located client systems, including a client system 1332, using a telephone link. Fax server 1306 is configured to communicate with other client systems 1316, 1318, and 1320 as well.

Figure 4:
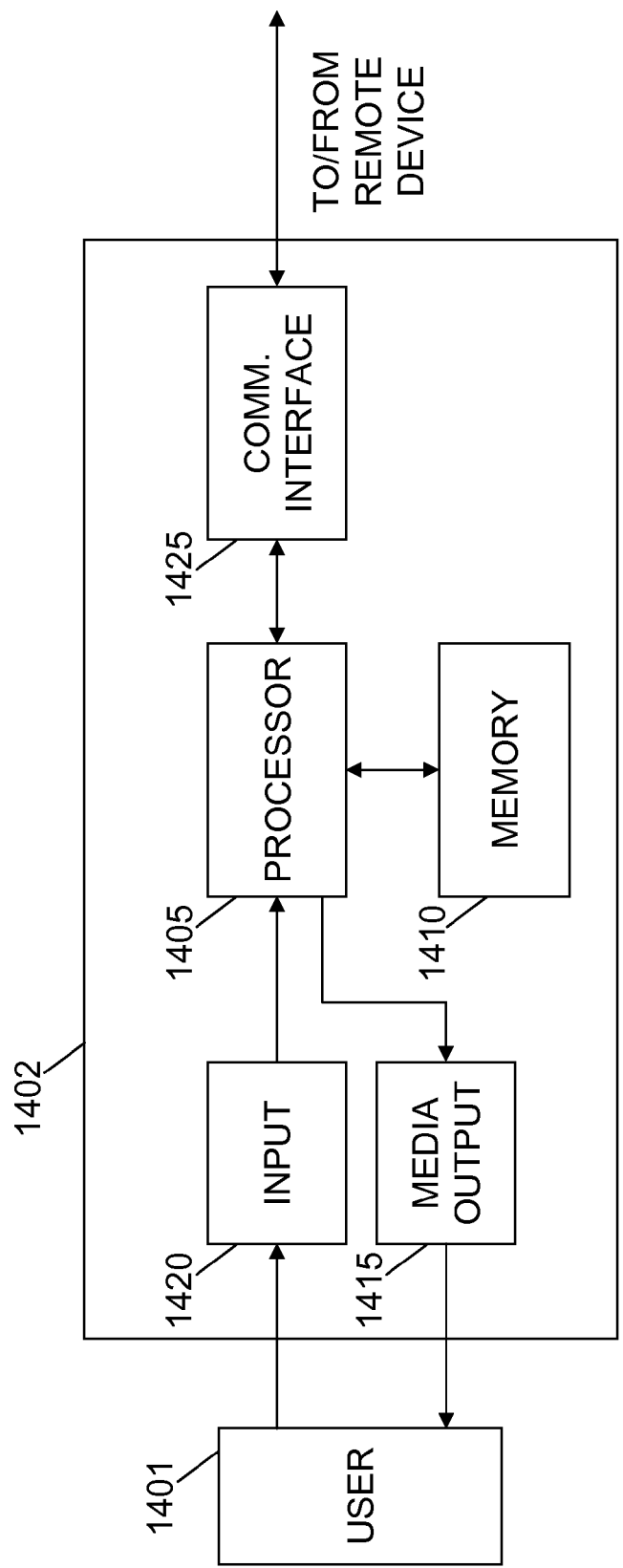

FIG. 4 illustrates an exemplary configuration of a cardholder computer device 1402 operated by a cardholder 1401. Cardholder computer device 1402 may include, but is not limited to, client systems 1204, 1316, 1318, and 1320, workstation 1330, and manager workstation 1332 (shown in FIG. 3).

Cardholder computer device 1402 includes a processor 1405 for executing instructions. In some embodiments, executable instructions are stored in a memory area 1410. Processor 1405 may include one or more processing units (e.g., in a multi-core configuration). Memory area 1410 is any device allowing information such as executable instructions and/or other data to be stored and retrieved. Memory area 1410 may include one or more computer readable media.

Cardholder computer device 1402 also includes at least one media output component 1415 for presenting information to cardholder 1401. Media output component 1415 is any component capable of conveying information to cardholder 1401. In some embodiments, media output component 1415 includes an output adapter such as a video adapter and/or an audio adapter. An output adapter is operatively coupled to processor 1405 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, cardholder computer device 1402 includes an input device 1420 for receiving input from cardholder 1401. Input device 1420 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 1415 and input device 1420.

Cardholder computer device 1402 may also include a communication interface 1425, which is communicatively couplable to a remote device such as server system 1202 or a web server operated by a merchant. Communication interface 1425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 1410 are, for example, computer readable instructions for providing a user interface to cardholder 1401 via media output component 1415 and, optionally, receiving and processing input from input device 1420. A user interface may include, among other possibilities, a web browser and client application. Web browsers enable cardholders, such as cardholder 1401, to display and interact with media and other information typically embedded on a web page or a website from server system 1202 or a web server associated with a merchant. A client application allows cardholder 1401 to interact with a server application from server system 1202 or a web server associated with a merchant.

Figure 5:
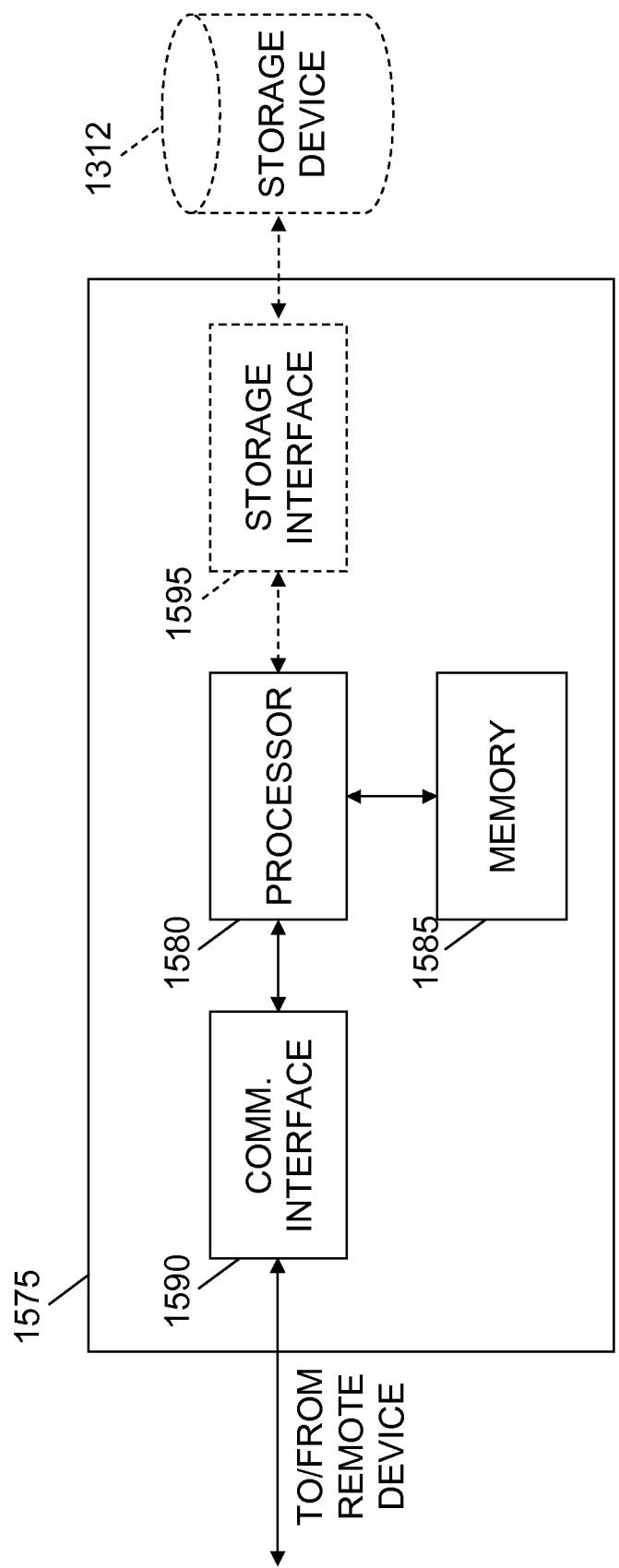

FIG. 5 illustrates an exemplary configuration of a server computer device 1575 such as server system 1202 (shown in FIGS. 2 and 3). Server computer device 1575 may include, but is not limited to, database server 1206, application server 1302, web server 1304, fax server 1306, directory server 1308, and mail server 1310.

Server computer device 1575 includes a processor 1580 for executing instructions. Instructions may be stored in a memory area 1585, for example. Processor 1580 may include one or more processing units (e.g., in a multi-core configuration).

Processor 1580 is operatively coupled to a communication interface 1590 such that server computer device 1575 is capable of communicating with a remote device such as cardholder computer device 1402 or another server computer device 1575. For example, communication interface 1590 may receive requests from client systems 1204 via the Internet, as illustrated in FIGS. 2 and 3.

Processor 1580 may also be operatively coupled to a storage device 1312. Storage device 1312 is any computer-operated hardware suitable for storing and/or retrieving data. In some embodiments, storage device 1312 is integrated in server computer device 1575. For example, server computer device 1575 may include one or more hard disk drives as storage device 1312. In other embodiments, storage device 1312 is external to server computer device 1575 and may be accessed by a plurality of server computer devices 1575. For example, storage device 1312 may include multiple storage units such as hard disks or solid state disks in a redundant array of inexpensive disks (RAID) configuration. Storage device 1312 may include a storage area network (SAN) and/or a network attached storage (NAS) system.

In some embodiments, processor 1580 is operatively coupled to storage device 1312 via a storage interface 1595. Storage interface 1595 is any component capable of providing processor 1580 with access to storage device 1312. Storage interface 1595 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1580 with access to storage device 1312.

Memory areas 1410 and 1585 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
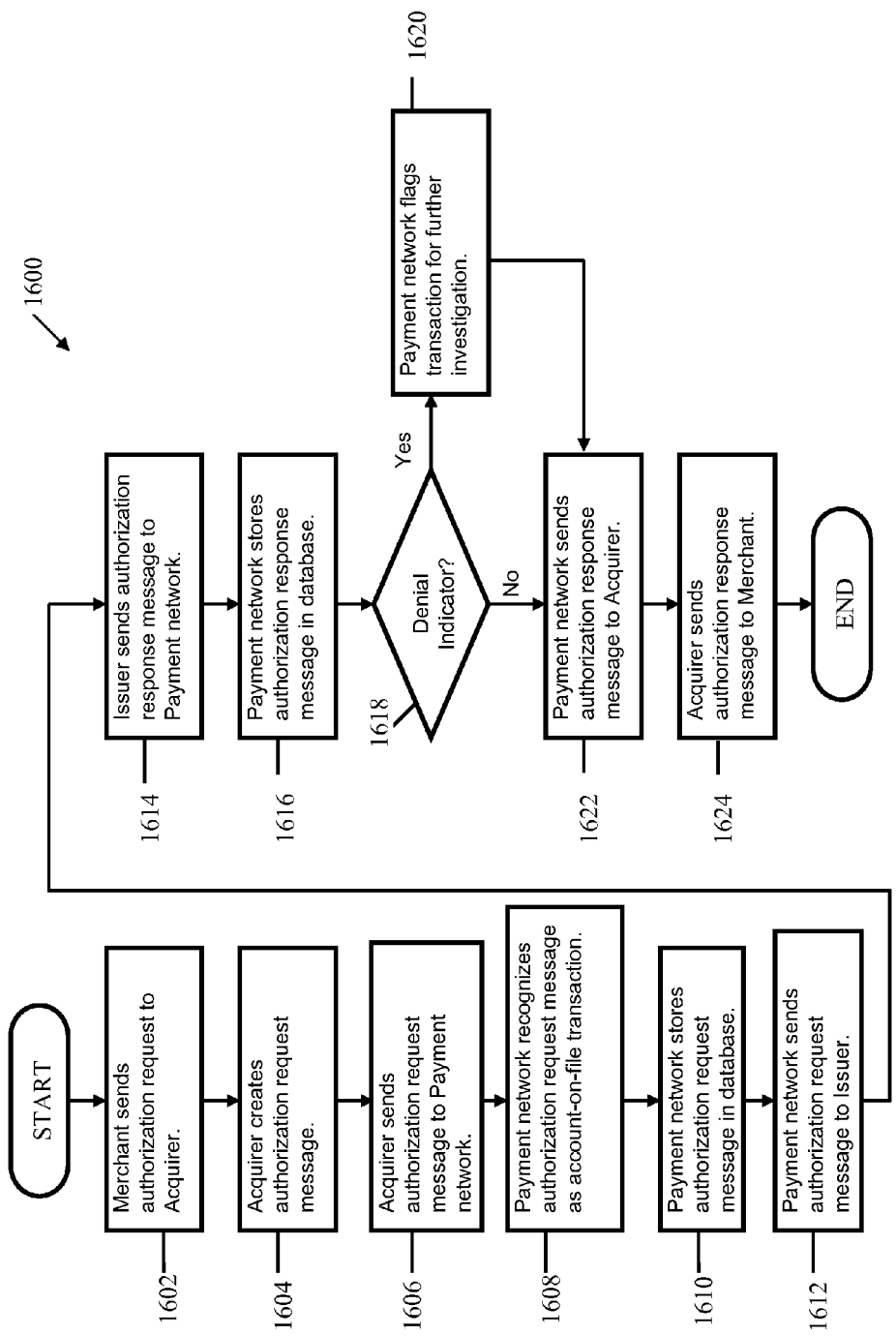

FIG. 6 is a flowchart of an exemplary method 1600 implemented by system 1300 (shown in FIG. 3) for processing an account-on-file transaction. During operation, in some implementations, a merchant transmits 1602 an authorization request to an acquirer 1322. In the exemplary implementation, payment card information is stored by a merchant after a cardholder initiates an original transaction using a payment card associated with the payment card information. Later, the merchant uses the stored payment card info to initiate subsequent transactions for the cardholder. These subsequent transactions are sometimes referred to as recurring transactions. When the authorization request is received by the acquirer 1322, a corresponding authorization request message is created 1604. The authorization request message is then transmitted 1606 to a payment network server system 1202.

When the payment network server system 1202 receives the authorization request message, transaction data is analyzed. Specifically, in the exemplary implementation, the payment network server system 1202 may recognize 1608 the authorization request message as a card-not-present account-on-file transaction via a flag. A flag is a datum, typically evaluated as "true" or "false", which may be used to characterize data. In various other implementations, a card-not-present account-on-file transaction may be recognized by any other distinct characteristic of the authorization request message or identifier that may be included within the authorization request message.

If the payment network server system 1202 recognizes the authorization request message as a card-not-present account-on-file transaction, the payment network server system 1202 stores 1610 the authorization request message in database 1208. After the authorization request message is stored in the database 1208, the payment network server system 1202 transmits 1612 the authorization request message to an issuer 1324 associated with the payment card.

The issuer 1324 receives the authorization request message and, subsequently, determines whether to approve the transaction based on, for example, whether the cardholder's account is open or has been closed, whether the payment card number is correct, and/or whether the expiration date associated with the payment card is correct. The issuer 1324 then sends 1614 an authorization response message back to the payment network server system 1202. The authorization response message includes an indication of whether the transaction was approved or denied. For example, in the exemplary implementation, if the transaction is denied, the issuer transmits 1614 an authorization response message to the payment network server system 1202 that includes a denial indicator. The denial indicator may indicate why the transaction is denied. In the exemplary embodiment, the denial indicator may include a code of 14, indicating an invalid payment card number. Also, in the exemplary embodiment, the denial indicator may include a code of 54, indicating an expired payment card or incorrect expiration date. Further, in the exemplary embodiment, the denial indicator may include a code of 5, representing a miscellaneous denial.

At step 1616, the payment network server system 1202 receives, from the issuer 1324, the authorization response message in response to the authorization request message. In the exemplary implementation, the payment network server system 1202 stores 1616 the authorization response message in database 1208. If the payment network server system 1202 identifies 1618 a denial indicator in the authorization response message, the payment network sever system 1202 includes a flag 1620 in the corresponding stored transaction data, thereby flagging it for further investigation. Subsequently, the payment network server system 1202 transmits 1622 the authorization response message to the acquirer 1322. In transmitting the authorization response message to acquirer 1322, the payment network server system 1202 may include a flag in the response message indicating that the transaction has been flagged for further investigation. The acquirer 1322 then transmits 1624 the authorization response message to the merchant.

Figure 7:
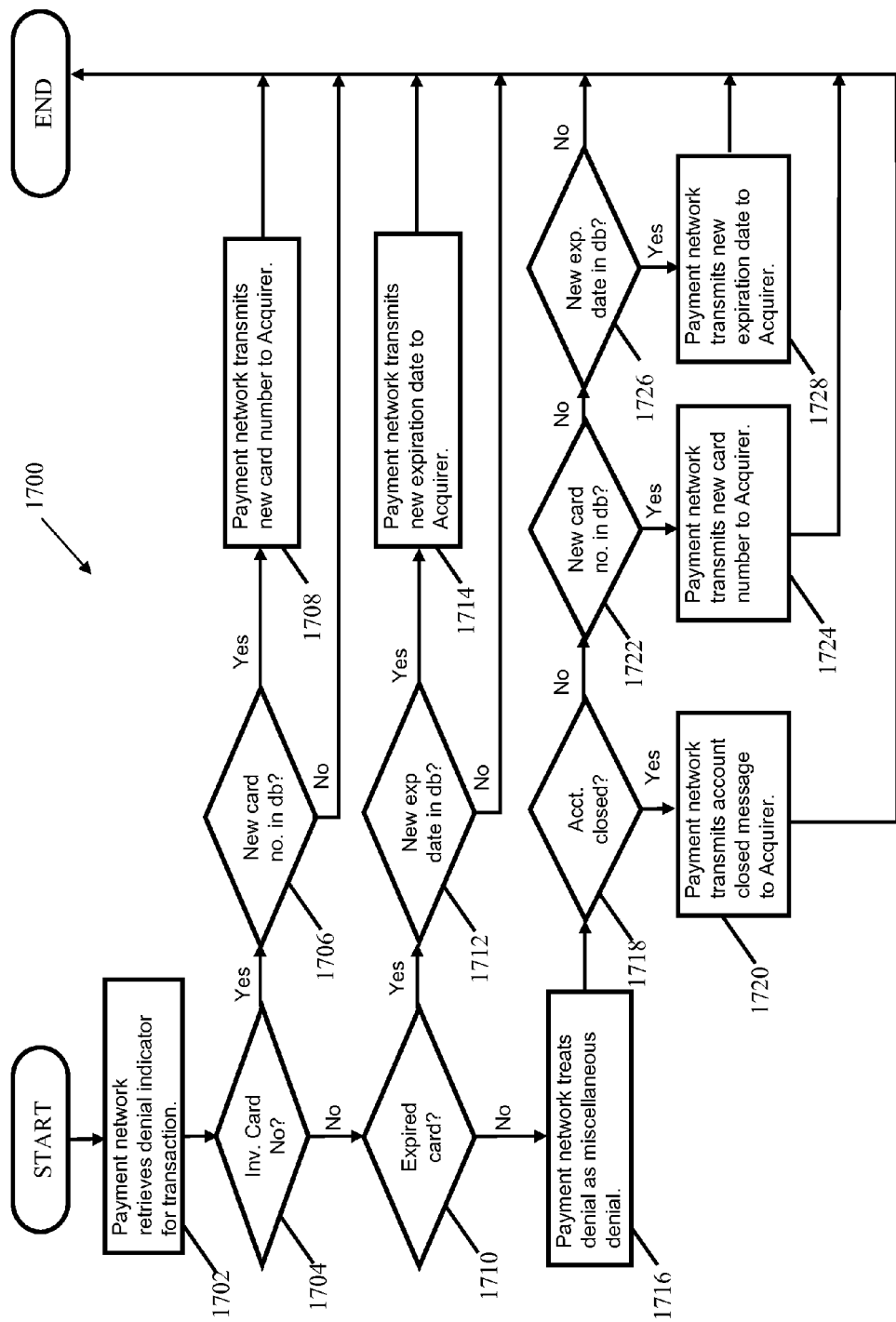

FIG. 7 is a flowchart of an exemplary method 1700 that may be implemented using system 1300 (shown in FIG. 3) to provide a merchant with updated payment card information. In the exemplary implementation, updated payment card information may be provided to a merchant when a card-not-present account-on-file transaction is denied. During operation, payment network server system 1202 retrieves 1702 from database 1208 data regarding transactions that have been flagged for further investigation, pursuant to step 1620 (shown in FIG. 6). As explained below, the payment network server system 1202 identifies the reason for the issuer's 1324 denial of the transaction by analyzing the retrieved data and, when available, transmits updated payment card information to the merchant.

In the exemplary method 1700, the payment network server system 1202 first determines 1704 if the denial indicator corresponds with an invalid payment card number. In the exemplary embodiment, the denial indicator includes a code of 54 (or any other identifier associated with an invalid payment card number) to represent that the issuer 1324 denied the transaction due to an invalid payment card number. When the denial indicator corresponds with an invalid payment card number, the payment network server system 1202 then determines 1706 if a new payment card number associated with the cardholder's account is available in the database 1208. In the exemplary implementation, a new payment card number may be available when the payment card number stored in the database 1208 differs from the payment card number associated with the denial indicator.

If a new payment card number is available, the payment network server system 1202 transmits 1708 the new payment card number to the acquirer 1322. In some embodiments, the payment network server system 1202 does not transmit updated payment card information, such as a new payment card number, to an acquirer 1322 until the acquirer requests updated payment card information. In other embodiments, the payment network server system 1202 proactively transmits the updated payment card information to the acquirer 1322 without a request from the acquirer 1322 for such information. In some embodiments, transmitting the new payment card number to the acquirer 1322, includes additionally transmitting identifying information pertaining to the transaction and/or the merchant, such as a transaction number, a transaction date, a transaction time, a purchase amount, a merchant name or number, and/or the original payment card information submitted in the authorization request message.

In some embodiments, the information is pushed to the acquirer electronically, such as through email, fax, short message service (SMS), telephonic voice message, or other electronic messaging means. In other embodiments, the information is sent to the acquirer via mail or a courier service. In yet other embodiments, the information is presented to the acquirer 1322 by payment network server system 1202 upon the acquirer 1322 successfully authenticating to server system 1202. For example, acquirer 1322 authenticates to payment network server system 1202 through a website operated by web server 1304. Upon successful authentication, web server 1304 presents the above-discussed transaction-identifying information, in addition to the updated payment card information, on a webpage. In such embodiments, the acquirer computer 1322 authenticates to the payment network server system 1202 using, for example, a username and password.

When the denial indicator does not correspond with an invalid payment card number, the payment network server system 1202 then determines 1710 if the denial indicator corresponds with an expired payment card or incorrect expiration date. In the exemplary embodiment, the denial indicator corresponds with an expired payment card or incorrect expiration date when the denial indicator includes a code of 54. When the denial indicator corresponds with an expired payment card or incorrect expiration date, the payment network server system 1202 then determines 1712 if a new payment card expiration date is available in the database 1208. When a new payment card expiration date is available in database 1208, the payment network server system 1202 transmits 1714 the new payment card expiration date to the acquirer as discussed above, with reference to step 1708.

When the denial indicator does not correspond with either of an invalid payment card number and an incorrect expiration date, the payment network server system 1202 determines 1716 that the denial indicator is a miscellaneous denial. That is, treating the denial indicator as being associated with a miscellaneous denial is a fallback position that the payment network server system 1202 will reach if the denial indicator is not associated with an invalid payment card number or an expired payment card number. However, in certain embodiments, the payment network server system 1202 will immediately reach this fallback position if the denial indicator includes a code associated with a miscellaneous denial. Again, in the exemplary embodiment, a code of 54 in a denial indicator indicates a miscellaneous denial.

In the exemplary implementation, a miscellaneous denial may be effected by various conditions, such as a closed account, an invalid payment card number, or an expired payment card or incorrect expiration date. Accordingly, the payment network first determines 1718 if the account associated with the payment card is closed by retrieving account status information from database 1208. When the account associated with the payment card is closed, according to database 1208, the payment network transmits 1720 a message to the acquirer 1322 indicating at least that the payment card account is closed. The transmission of this information is carried out as discussed above, with reference to step 1708.

If, according to the database 1208, the account associated with the payment card is open, the payment network server system 1202 then determines 1722 if a new payment card number is stored in the database 1208. If a new payment card number is stored in the database 1208, the payment network server system 1202 transmits 1724 the new payment card number to the acquirer 1322. The transmission of this information is carried out as discussed above, with reference to step 1708.

When the account associated with the payment card is open and a new payment card number is not available in the payment network database 1208, the payment network server system 1202 then determines 1726 if a new payment card expiration date is stored in the database 1208. If a new payment card expiration date is stored in the database 1208, the payment network server system 1202 transmits 1728 the new payment card expiration date to the acquirer 1322. The transmission of this information is carried out as discussed above, with reference to step 1708.

Upon receiving updated payment card information associated with a transaction authorization request that was denied, the acquirer 1322 provides the updated information to the merchant to enable to merchant to update its records. The acquirer 1322 may present the updated information to the merchant proactively, or upon request by the merchant. The merchant may then resubmit the transaction using the updated payment card information. In alternative embodiments, the payment network server generates and transmits a subsequent authorization request message to the issuer on behalf of the merchant, without the merchant or acquirer taking steps to initiate a subsequent transaction with the updated payment card information. The subsequent authorization request message generated and transmitted by the payment network server in such alternative embodiments includes the updated payment card information.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The following description pertains to a second set of embodiments of the present invention.

As used herein, an acquiring bank, or acquirer, is typically a bank at which a merchant holds an account. Further, an issuing bank, or issuer, is typically a bank at which a customer, or cardholder, holds an account. The account may be debited or charged through the use of a debit card, a credit card, or another type of financial transaction card as described herein.

Financial transaction cards, or payment cards, may refer to credit cards, debit cards, and prepaid cards. These cards may all be used as a method of payment for performing a transaction, such as a recurring transaction. As described herein, the term "financial transaction card" or "payment card" includes cards such as credit cards, debit cards, and prepaid cards. Also included is any other device that may hold payment account information for use in recurring transactions, such as mobile phones, personal digital assistants (PDAs), and key fobs.

As used herein, a processor may include any programmable system including systems using microcontrollers, reduced instruction set circuits (RISC), application specific integrated circuits (ASICs), logic circuits, and any other circuit or processor capable of executing the functions described herein. The above examples are exemplary only, and thus are not intended to limit the definition and/or meaning of the term "processor" in any way.

Described in detail herein are exemplary embodiments of systems and methods that facilitate correcting an authorization request message in a card-not-present account-on-file transaction, wherein the authorization request message includes outdated payment card information stored by a merchant. The systems and methods facilitate, for example, receiving an authorization request for a transaction from a particular merchant who is conducting card-not-present account-on-file transactions, determining that an expiration date for a payment card associated with the transaction is outdated, and correcting the authorization request before transmitting the authorization request to an issuer associated with the payment card. That is, if a card-not-present account-on-file authorization request message from a merchant includes an expiration date for a payment card, and querying a database of payment card information pertaining to transactions where the payment card was presented to a merchant indicates that a later expiration date is associated with the payment card, certain systems and methods according to the present invention facilitate replacing the earlier expiration date in the authorization request message with the later expiration date stored in the database. Certain systems and methods according to the present invention facilitate sending the corrected authorization request message to the issuer associated with the payment card, thereby reducing the likelihood of a denial of the authorization request message by the issuer due to an outdated expiration date.

A technical effect of the systems and methods described herein include at least one of (a) receiving a first authorization request message for the transaction, the first authorization request message received at a computer device from an acquirer associated with the merchant; (b) determining that the first authorization request message corresponds to a card-not-present account-on-file transaction based on a first flag present in the first authorization request message; (c) identifying a first expiration date included in the authorization request message for a payment card number used for the transaction; (d) querying a database coupled to the computer device to determine if a second expiration date associated with the payment card number is stored therein, the second expiration date being later than the first expiration date; (e) modifying the authorization request message at the computer device by replacing the first expiration date with the second expiration date; and (f) transmitting the authorization request message to an issuer associated with the payment card.

In one embodiment, computer-executable instructions are provided and are embodied on a non-transitory computer readable storage medium. The computer-executable instructions cause a computer executing the instructions to utilize a Structured Query Language (SQL) with a client user interface front-end for administration and a web interface for standard user inputs and reports. In an exemplary embodiment, the system is web-enabled and is run on a business entity intranet. In an alternative embodiment, the system is fully accessible by individuals having authorized access from outside a firewall of the business-entity through the Internet. In a further alternative embodiment, the system is run in a Windows® environment (Windows is a registered trademark of Microsoft Corporation, Redmond, Wash.). The application is flexible and designed to run in various different environments without compromising any major functionality.

Figure 8:
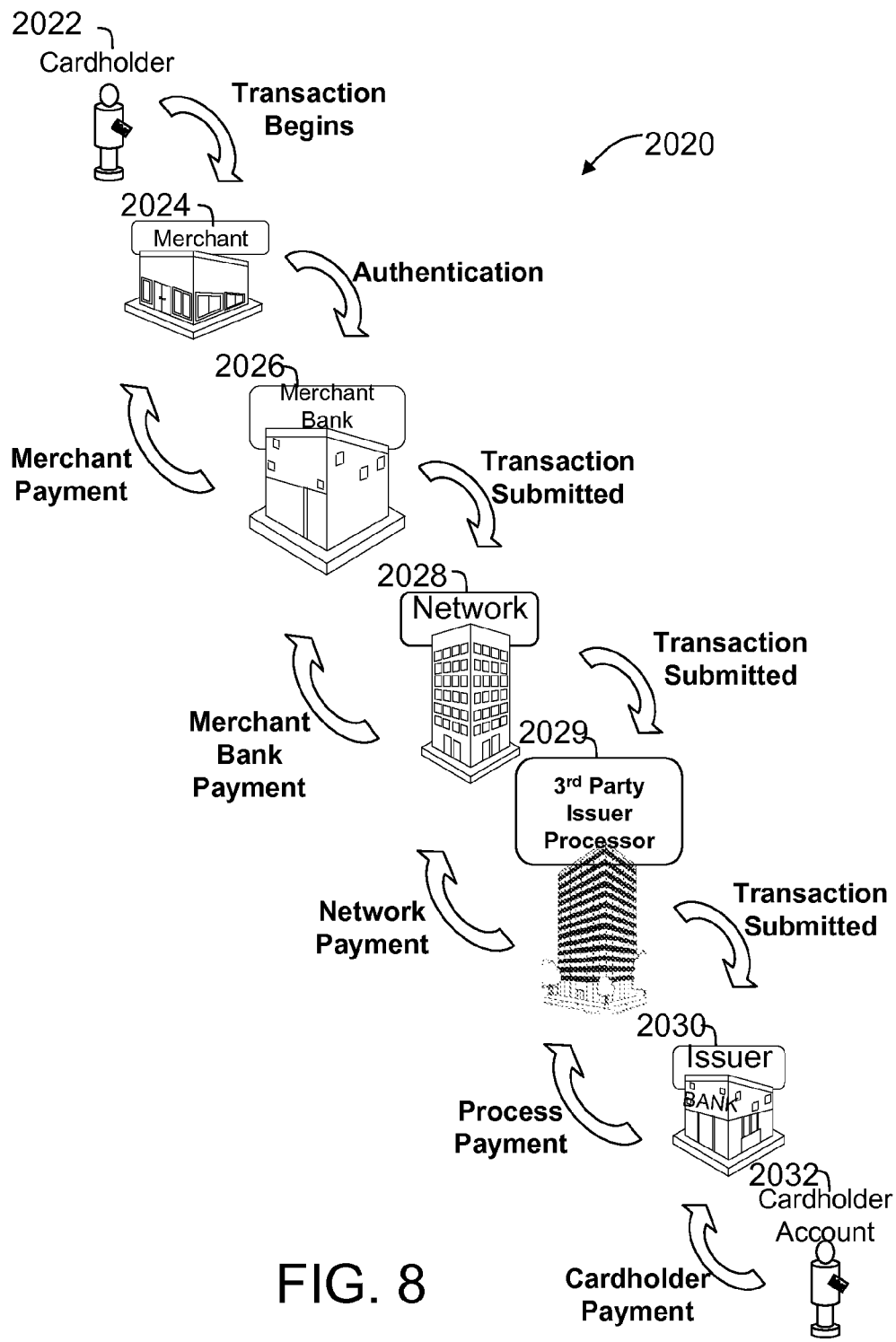
FIGS. 8-14 pertain to a second set of embodiments of the present invention.

FIG. 8 is a schematic diagram illustrating an exemplary multi-party payment card system 2020 for enabling ordinary payment-by-card transactions in which merchants and card issuers do not necessarily have a one-to-one relationship. The present invention relates to payment card system 2020, such as a credit card payment system using the MasterCard® payment card system interchange network 2028. MasterCard® payment card system interchange network 2028, which is an example of a payment network, is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 2020, a financial institution such as an issuer 2030 issues a payment account card, such as a credit card account or a debit card account, to a cardholder 2022, who uses the payment account card to tender payment for a purchase from a merchant 2024. To accept payment with the payment account card, merchant 2024 must normally establish an account with a financial institution that is part of the financial payment system. This financial institution is usually called the "merchant bank" or the "acquiring bank" or "acquirer bank" or simply "acquirer". When a cardholder 2022 tenders payment for a purchase with a payment account card (also known as a financial transaction card), merchant 2024 requests authorization from acquirer 2026 for the amount of the purchase. The request may be performed over the telephone, but is usually performed through the use of a point-of-interaction terminal, which reads the cardholder's account information from the magnetic stripe on the payment account card and communicates electronically with the transaction processing computers of acquirer 2026. Alternatively, acquirer 2026 may authorize a third party to perform transaction processing on its behalf. In this case, the point-of-interaction terminal will be configured to communicate with the third party. Such a third party is usually called a "merchant processor" or an "acquiring processor."

Using payment card system interchange network 2028, the computers of acquirer 2026 or the merchant processor will communicate with the computers of issuer 2030 to determine whether the cardholder's account is in good standing and whether the purchase is covered by the cardholder's available credit line or account balance. Based on these determinations, the request for authorization will be declined or accepted. If the request is accepted, an authorization code is issued to merchant 2024.

When a request for authorization is accepted, the available credit line or available balance of cardholder's account 2032 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 2024 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, the cardholder's account 2032 is decreased. Normally, a charge is posted immediately to cardholder's account 2032. The bankcard association then transmits the approval to the acquiring processor for distribution of goods/services, or information or cash in the case of an ATM.

After a transaction is captured, the transaction is settled between merchant 2024, acquirer 2026, and issuer 2030. Settlement refers to the transfer of financial data or funds between the merchant's account, acquirer 2026, and issuer 2030 related to the transaction. Usually, transactions are captured and accumulated into a "batch," which is settled as a group.

While the above discussion describes a type of transaction wherein the cardholder and the payment card are present at the point of interaction, card-not-present account-on-file transactions follow a different process. The process begins when a cardholder establishes an account-on-file payment relationship with a merchant. The cardholder provides payment card information to the merchant, thereby enabling the merchant to periodically charge the cardholder for a product or service by automatically charging the payment card on file. For example, the cardholder enters the payment card information into a web browser and submits the payment card information to the merchant. Thereafter, the merchant stores the payment card information in a database and/or server. The payment card information used by the merchant may include the cardholder's name as it appears on the payment card, a billing address, an account number or card number of the payment card, and/or an expiration date of the payment card.

At some point after the cardholder establishes the account-on-file relationship with the merchant, an issuing bank, or issuer, sends the cardholder a replacement payment card and, while the card number may stay the same, the expiration date is changed to a later date. In such a case, the new expiration date for the payment card is not on file with the merchant. Accordingly, when the merchant attempts to charge the cardholder for a payment using the payment card information stored by the merchant, the transaction is at risk of being denied due to the outdated expiration date.

Figure 9:
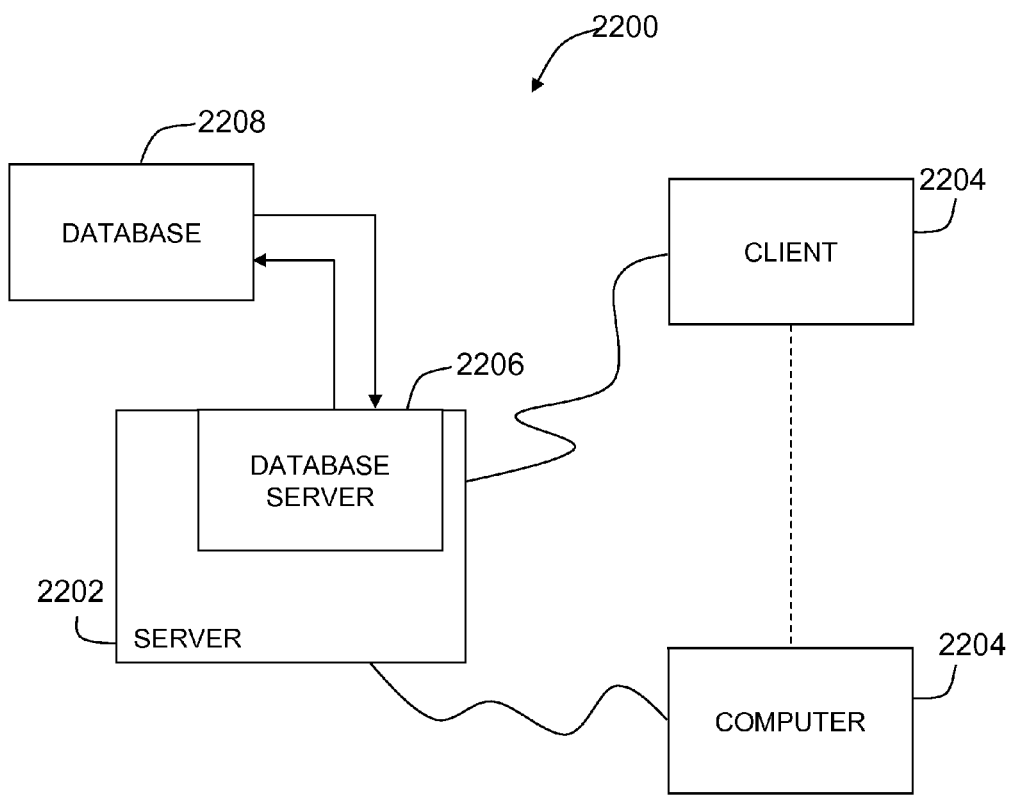

FIG. 9 is a simplified block diagram of an exemplary system 2200 in accordance with one embodiment of the present invention. In one embodiment, system 2200 is the financial transaction card payment system shown in FIG. 8, which may be utilized for processing account-on-file payments. More specifically, in the exemplary embodiment, system 2200 includes a server system 2202 and a plurality of client subsystems, also referred to as client systems 2204, connected to server system 2202. In one embodiment, client systems 2204 are computers including a web browser, such that server system 2202 is accessible to client systems 2204 using the Internet. Client systems 2204 are interconnected to the Internet through many interfaces including a network, such as a local area network (LAN) and/or a wide area network (WAN), dial-in connections, cable modems, wireless-connections, and special high-speed ISDN lines. Client systems 2204 may be any device capable of interconnecting to the Internet including a web-based phone, personal digital assistant (PDA), or other web-connectable equipment. A database server 2206 is connected to a database 2208 containing information on a variety of matters, as described below in greater detail. In one embodiment, database 2208 is stored on server system 2202 and may be accessed by potential users at one of client systems 2204 by logging onto server system 2202 through one of client systems 2204. In any alternative embodiment, database 2208 is stored remotely from server system 2202 and may be non-centralized.

As discussed below, payment card information including account numbers, payment card numbers, expiration dates, and account statuses, such as whether the account is open or closed, is stored within database 2208. Further, data relating to the cardholder of a payment card may also be stored within database 2208. Such cardholder data may include, for example, cardholder name and cardholder billing address.

Figure 10:
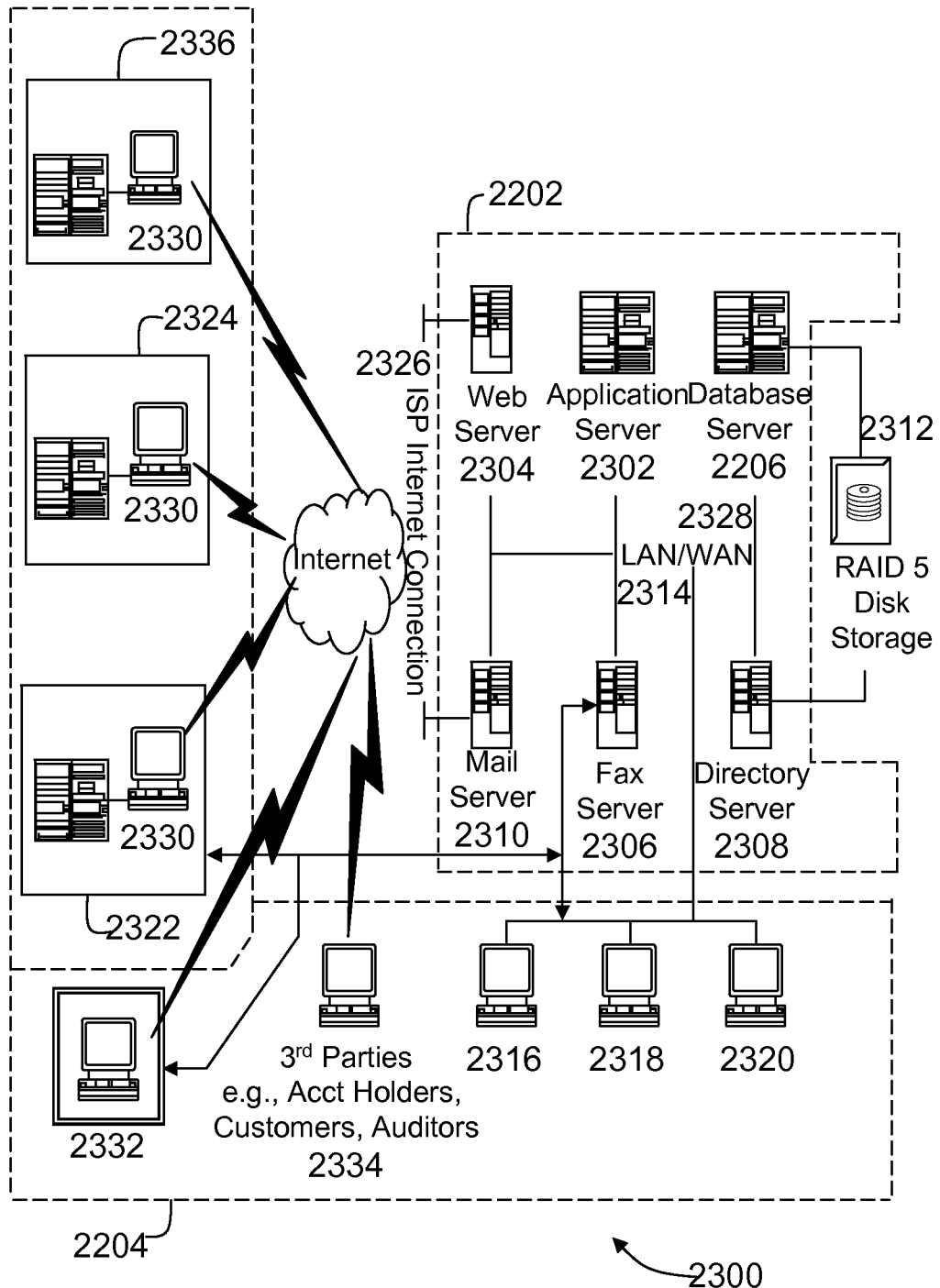

FIG. 10 is an expanded block diagram of an exemplary embodiment of a server architecture of a system 2300 in accordance with one embodiment of the present invention. Components in system 2300, identical to components of system 2200 (shown in FIG. 9), are identified in FIG. 10 using the same reference numerals used in FIG. 9. System 2300 includes server system 2202 and client systems 2204. Server system 2202 further includes database server 2206, an application server 2302, a web server 2304, a fax server 2306, a directory server 2308, and a mail server 2310. A disk storage unit 2312 is coupled to database server 2206 and directory server 2308. Servers 2206, 2302, 2304, 2306, 2308, and 2310 are coupled in a local area network (LAN) 2314. In addition, a system administrator's workstation 2316, a user workstation 2318, and a supervisor's workstation 2320 are coupled to LAN 2314. Alternatively, workstations 2316, 2318, and 2320 are coupled to LAN 2314 using an Internet link or are connected through an Intranet.

Each workstation, 2316, 2318, and 2320, is a personal computer having a web browser. Although the functions performed at the workstations typically are illustrated as being performed at respective workstations 2316, 2318, and 2320, such functions can be performed at one of many personal computers coupled to LAN 2314. Workstations 2316, 2318, and 2320 are illustrated as being associated with separate functions only to facilitate an understanding of the different types of functions that can be performed by individuals having access to LAN 2314.

Server system 2202 is configured to be communicatively coupled to various entities, including acquirers 2322 and issuers 2324, and to third parties, e.g., auditors, 2334 using an Internet connection 2326. Server system 2202 may also be communicatively coupled with a merchant 2336. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 2328, local area network 2314 could be used in place of WAN 2328.

In the exemplary embodiment, any authorized individual or entity having a workstation 2330 may access system 2300. At least one of the client systems includes a manager workstation 2332 located at a remote location. Workstations 2330 and 2332 include personal computers having a web browser. Also, workstations 2330 and 2332 are configured to communicate with server system 2202. Furthermore, fax server 2306 communicates with remotely located client systems, including a client system 2332, using a telephone link. Fax server 2306 is configured to communicate with other client systems 2316, 2318, and 2320 as well.

Figure 11:
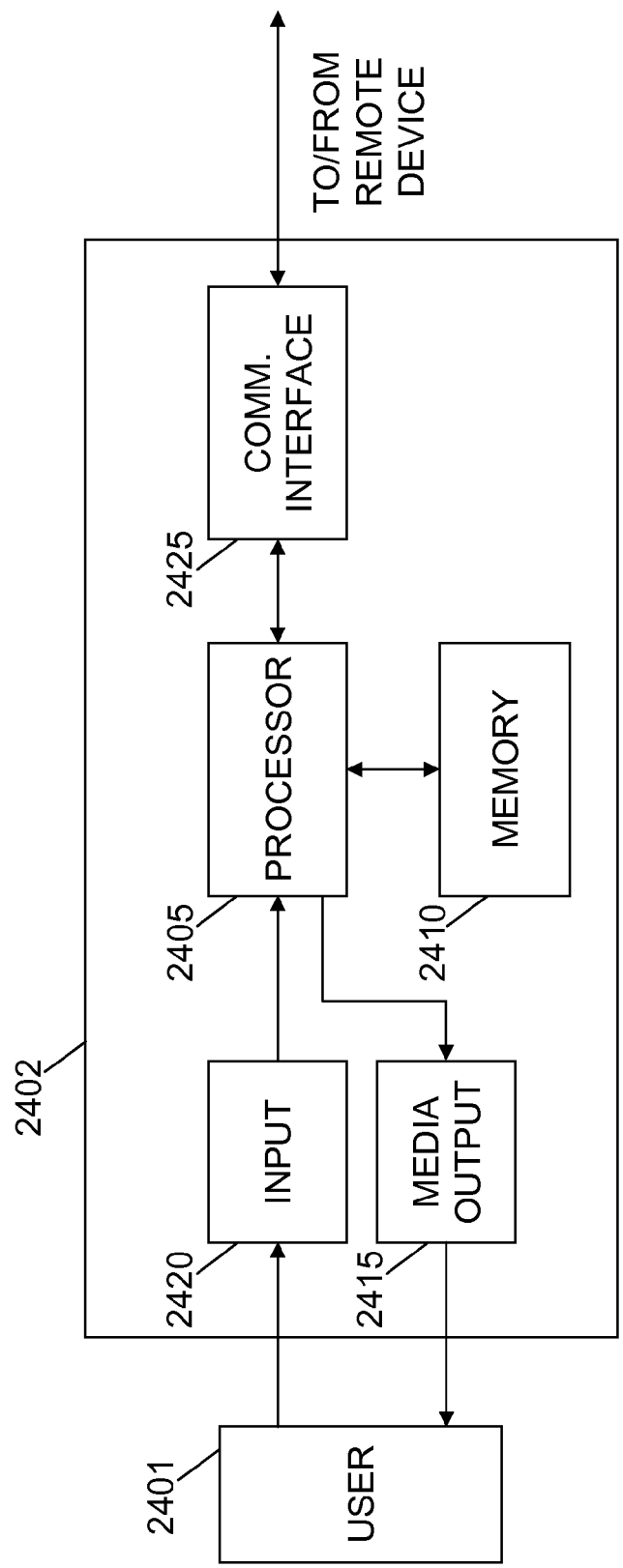

FIG. 11 illustrates an exemplary configuration of a cardholder computer device 2402 operated by a cardholder 2401. Cardholder computer device 2402 may include, but is not limited to, client systems 2204, 2316, 2318, and 2320, workstation 2330, and manager workstation 2332 (shown in FIG. 10).

Cardholder computer device 2402 includes a processor 2405 for executing instructions. In some embodiments, executable instructions are stored in a memory area 2410.

Processor 2405 may include one or more processing units (e.g., in a multi-core configuration). Memory area 2410 is any device allowing information such as executable instructions and/or other data to be stored and retrieved. Memory area 2410 may include one or more computer readable media.

Cardholder computer device 2402 also includes at least one media output component 2415 for presenting information to cardholder 2401. Media output component 2415 is any component capable of conveying information to cardholder 2401. In some embodiments, media output component 2415 includes an output adapter such as a video adapter and/or an audio adapter. An output adapter is operatively coupled to processor 2405 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, cardholder computer device 2402 includes an input device 2420 for receiving input from cardholder 2401. Input device 2420 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 2415 and input device 2420.

Cardholder computer device 2402 may also include a communication interface 2425, which is communicatively couplable to a remote device such as server system 2202 or a web server operated by a merchant. Communication interface 2425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 2410 are, for example, computer readable instructions for providing a user interface to cardholder 2401 via media output component 2415 and, optionally, receiving and processing input from input device 2420. A user interface may include, among other possibilities, a web browser and client application. Web browsers enable cardholders, such as cardholder 2401, to display and interact with media and other information typically embedded on a web page or a website from server system 2202 or a web server associated with a merchant. A client application allows cardholder 2401 to interact with a server application from server system 2202 or a web server associated with a merchant.

Figure 12:
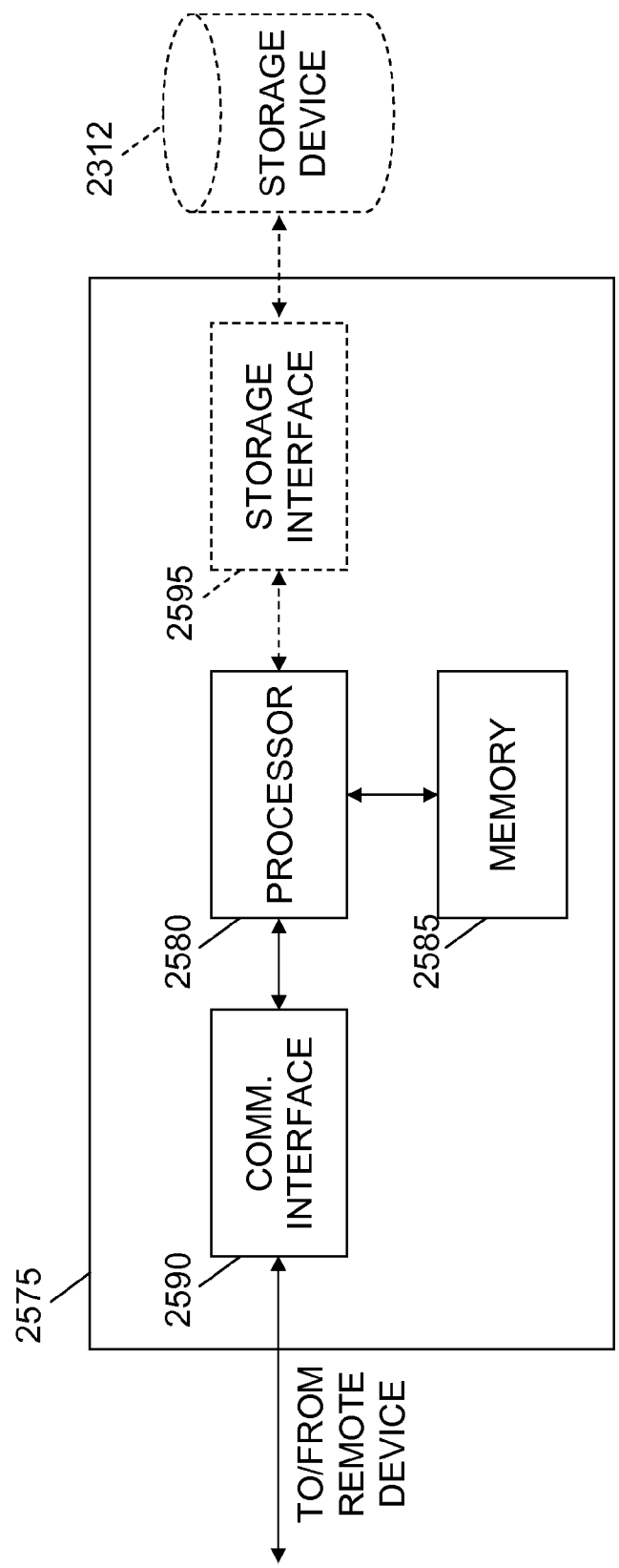

FIG. 12 illustrates an exemplary configuration of a server computer device 2575 such as server system 2202 (shown in FIGS. 9 and 10). Server computer device 2575 may include, but is not limited to, database server 2206, application server 2302, web server 2304, fax server 2306, directory server 2308, and mail server 2310.

Server computer device 2575 includes a processor 2580 for executing instructions. Instructions may be stored in a memory area 2585, for example. Processor 2580 may include one or more processing units (e.g., in a multi-core configuration).

Processor 2580 is operatively coupled to a communication interface 2590 such that server computer device 2575 is capable of communicating with a remote device such as cardholder computer device 2402 or another server computer device 2575. For example, communication interface 2590 may receive requests from client systems 2204 via the Internet, as illustrated in FIGS. 9 and 10.

Processor 2580 may also be operatively coupled to a storage device 2312. Storage device 2312 is any computer-operated hardware suitable for storing and/or retrieving data. In some embodiments, storage device 2312 is integrated in server computer device 2575. For example, server computer device 2575 may include one or more hard disk drives as storage device 2312. In other embodiments, storage device 2312 is external to server computer device 2575 and may be accessed by a plurality of server computer devices 2575. For example, storage device 2312 may include multiple storage units such as hard disks or solid state disks in a redundant array of inexpensive disks (RAID) configuration. Storage device 2312 may include a storage area network (SAN) and/or a network attached storage (NAS) system.

In some embodiments, processor 2580 is operatively coupled to storage device 2312 via a storage interface 2595. Storage interface 2595 is any component capable of providing processor 2580 with access to storage device 2312. Storage interface 2595 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 2580 with access to storage device 2312.

Memory areas 2410 and 2585 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 13:
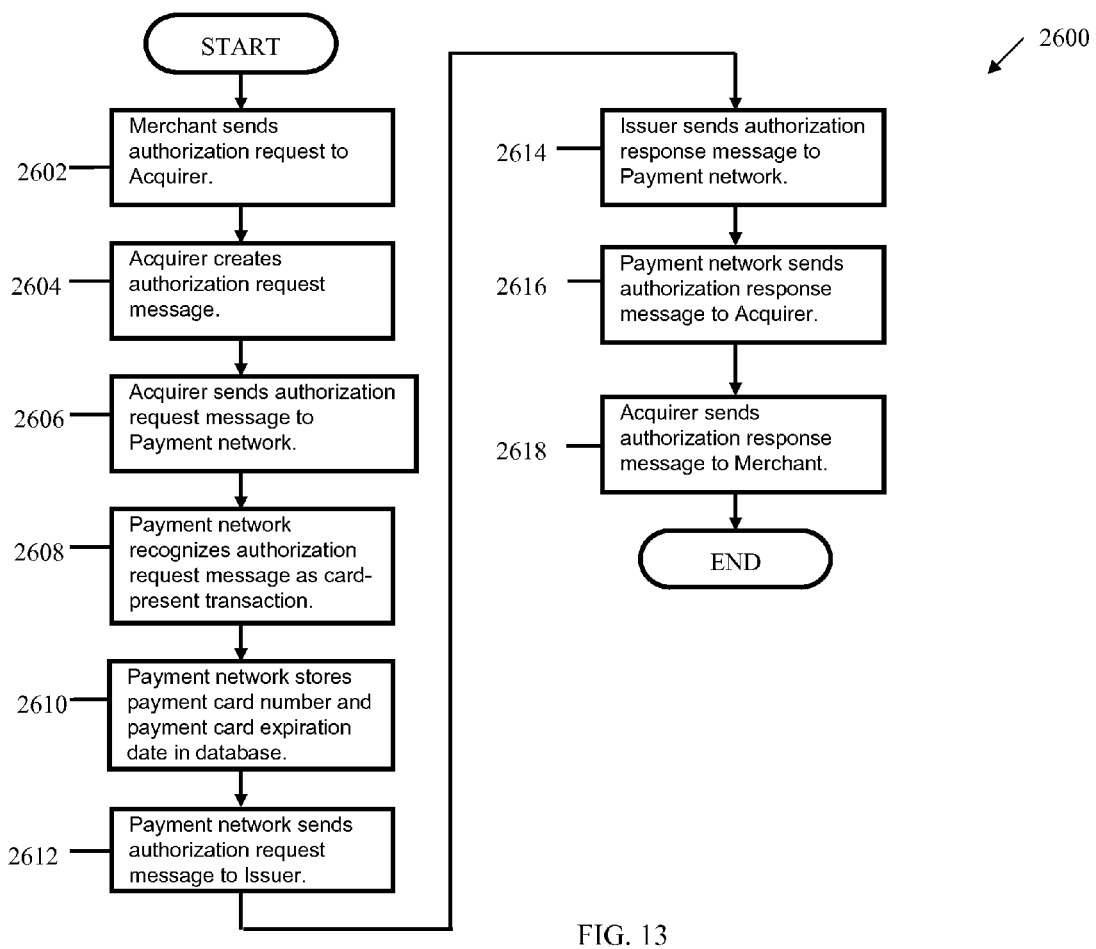

FIG. 13 is a flowchart of an exemplary method 2600 utilized by system 2300 (shown in FIG. 10) for processing a payment transaction in which a payment card is present at the point of interaction of a merchant 2336. During operation, in some implementations, a merchant 2336 transmits 2602 an authorization request to an acquirer 2322. In the exemplary implementation, authorization request data is generated when a transaction is initiated by a cardholder using a payment card that is present at the point of interaction of merchant 2336. When the authorization request is received by the acquirer 2322, a corresponding authorization request message is created 2604. The authorization request message includes, among other data, the payment card number and the expiration date of the payment card. In alternative embodiments, the authorization request message includes additional data, for example, a merchant identifier, an acquirer identifier, a transaction date, and a transaction amount. The authorization request message is then transmitted 2606 to a payment network server system 2202.

When the payment network server system 2202 receives the authorization request message, transaction data is analyzed. Specifically, in the exemplary implementation, the payment network server system 2202 may recognize 2608 the authorization request message as a card-present transaction via a flag. A flag is a datum, typically evaluated as "true" or "false", which may be used to characterize data. In various other implementations, a card-present transaction may be recognized by any other distinct characteristic of the authorization request message, including the absence of a flag indicating that the transaction is other than a card-present transaction.

Upon recognizing the authorization request message as pertaining to a card-present transaction, payment network server system 2202 stores 2610 data from the authorization request message in database 2208. In the exemplary embodiment, payment network server system 2202 stores in database 2208 at least the payment card number and the expiration date associated with the payment card number. In other embodiments, payment network server system 2202 stores additional information, for example, the merchant identifier, the acquirer identifier, and the transaction date. After data from the authorization request message is stored in the database 2208, the payment network server system 2202 transmits 2612 the authorization request message to an issuer 2324 associated with the payment card.

The issuer 2324 receives the authorization request message and, subsequently, determines whether to approve the transaction based on, for example, whether the cardholder's account is open or has been closed, whether the cardholder's account has sufficient funds or credit, whether the payment card number is correct, and/or whether the expiration date associated with the payment card is correct. The issuer 2324 then sends 2614 an authorization response message back to the payment network server system 2202. The authorization response message includes an indication of whether the transaction was approved or denied. For example, in the exemplary implementation, if the transaction is denied, the issuer transmits 2614 an authorization response message to the payment network server system 2202 that includes a denial indicator. The denial indicator may indicate why the transaction is denied. In the exemplary embodiment, the denial indicator may include a code of 14, indicating an invalid payment card number. Also, in the exemplary embodiment, the denial indicator may include a code of 54, indicating an outdated or incorrect expiration date. Further, in the exemplary embodiment, the denial indicator may include a code of 5, representing a miscellaneous denial. In other embodiments, other codes are used to represent reasons for denial of the authorization request.

At step 2614, the payment network server system 2202 receives, from the issuer 2324, the authorization response message in response to the authorization request message. In some embodiments, payment network server system 2202 will delete the data stored in database 2208 from step 2610 if the authorization response includes a denial indicator indicating that the expiration date is outdated or incorrect. This might occur if the cardholder has been issued a newer payment card and the cardholder has accidentally attempted to use the older payment card in a transaction after the expiration date on the older card has passed. At step 2616, the payment network server system 2202 transmits the authorization response message to the acquirer 2322. The acquirer 2322 then transmits 2618 the authorization response message to the merchant 2336.

Figure 14:
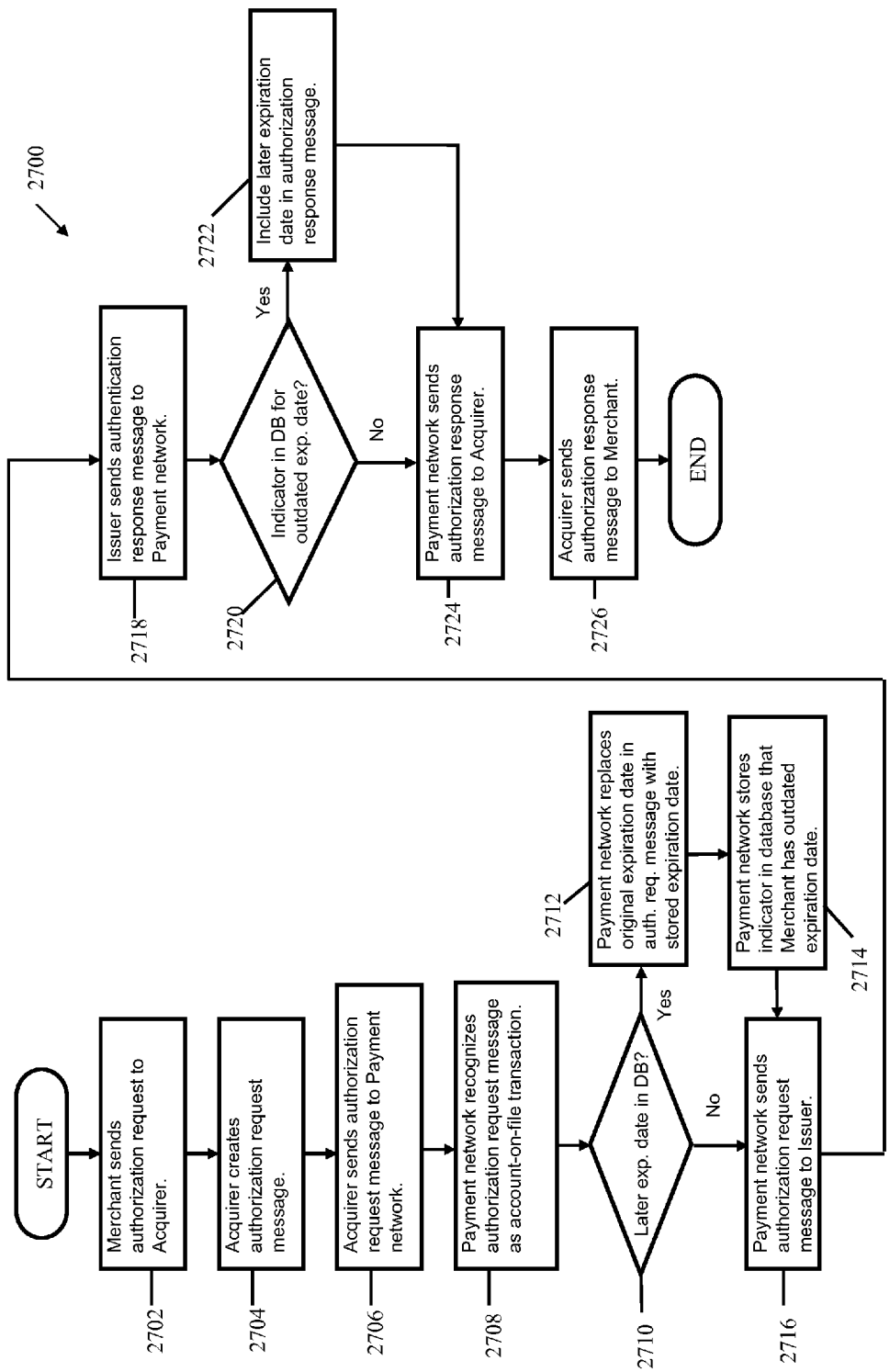

FIG. 14 is a flowchart of an exemplary method 2700 that may be implemented using system 2300 (shown in FIG. 10) to correct an outdated payment card expiration date used in a transaction. In the exemplary implementation, payment card information is stored by a merchant after a cardholder initiates an original transaction using a payment card associated with the payment card information. Later, the merchant uses the stored payment card information to initiate subsequent transactions for the cardholder. These subsequent transactions are sometimes referred to as card-not-present account-on-file transactions. If a merchant 2336 is initiating a card-not-present account-on-file transaction on behalf of a cardholder using a stored payment card expiration date that is outdated, the method 2700 may correct the expiration date prior to an authorization request message for the transaction reaching the cardholder's issuer 2324.

At step 2702, merchant 2336 sends an authorization request for a card-not-present account-on-file transaction to an acquirer 2322. The merchant and acquirer of method 2700 may be different than the merchant and acquirer of method 2600, shown in FIG. 13. However, for simplicity, the merchants and acquirers of both methods, 2600 (FIG. 13) and 2700 (FIG. 14), are referred to with the same labels, 2322 and 2336, in system 2300 (FIG. 10). The merchant 2336 has included a stored payment card number and a stored expiration date for the payment card in the authorization request. When the authorization request is received by the acquirer 2322, acquirer 2322 creates 2704 a corresponding authorization request message. The authorization request message includes, among other data, the payment card number and the expiration date of the payment card. In alternative embodiments, the authorization request message includes additional data, for example, a merchant identifier, an acquirer identifier, a transaction date, and a transaction amount. At step 2706, acquirer 2322 transmits the authorization request message to payment network server system 2202.

When payment network server system 2202 receives the authorization request message, payment network server system 2202 analyzes the content of the authorization request message. Specifically, in the exemplary implementation, payment network server system 2202 recognizes 2708 the authorization request message as a card-not-present account-on-file transaction due to a flag. As explained above, a flag is a datum, typically evaluated as "true" or "false", which may be used to characterize data. In various other implementations, a card-not-present account-on-file transaction may be recognized by any other distinct characteristic of the authorization request message, including the absence of a flag indicating that the transaction is other than a card-not-present account-on-file transaction.

Upon recognizing the authorization request message as pertaining to a card-not-present account-on-file transaction, payment network server system 2202 queries database 2208 and determines 2710 whether the expiration date in the authorization request message is earlier than an expiration date stored in database 2208 for the payment card. For example, the database 2208 might contain a later expiration date for the payment card upon the performance of step 2610 in method 2600 (FIG. 13). In some embodiments, payment network server system 2202 first determines whether the date of the transaction associated with the authorization request message is equal to or later than the payment card expiration date stated in the authorization request message, and proceeds with querying database 2208 for a later payment card expiration date only if the date of the transaction is equal to or later than the payment card expiration date stated in the authorization request message.

If the payment card expiration date in the authorization request message is earlier than an expiration date stored in database 2208 for the same payment card, then at step 2712, payment network server 2202 replaces the original expiration date in the authorization request message with the later expiration date from the database 2208. Further, at step 2714, payment network server 2202 stores 2714 an indicator in database 2208 indicating that merchant 2336 has an outdated expiration date for the payment card. In some embodiments, payment network server 2202 performs steps 2712 and 2714 only if the later expiration date stored in database 2208 is equal to or later than the date of the transaction.

At step 2716, payment network server 2202 transmits the authorization request message to issuer 2324. The issuer 2324 receives the authorization request message and, subsequently, determines whether to approve the transaction based on, for example, whether the cardholder's account is open or has been closed, whether the cardholder's account has sufficient funds or credit, whether the payment card number is correct, and/or whether the expiration date associated with the payment card is correct. The issuer 2324 then sends 2718 an authorization response message back to the payment network server system 2202. The authorization response message includes an indication of whether the transaction was approved or denied. For example, in the exemplary implementation, if the transaction is denied, the issuer transmits 2614 an authorization response message to the payment network server system 2202 that includes a denial indicator.

At step 2720, the payment network server system 2202 receives, from the issuer 2324, the authorization response message in response to the authorization request message and queries database 2208 to determine whether database 2208 contains an indicator that merchant 2336 has an outdate expiration date for the payment card. If database 2208 contains an indicator that merchant 2336 has an outdated expiration date for the payment card, payment network server 2202 includes 2722 the later expiration (stored in database 2208) in the authorization response message. At step 2724, the payment network server system 2202 transmits the authorization response message to the acquirer 2322. The acquirer 2322 then transmits 2726 the authorization response message to the merchant 2336. In alternative embodiments, rather than including the later expiration date in the authorization response message, payment network server 2202 will provide the later payment card expiration date to acquirer 2322 and/or merchant 2336 through another delivery method, for example email, short message service (SMS), fax, telephonic voice message, mail, courier, and/or a secure website for which acquirer 2322 and/or merchant 2336 are provided authentication credentials. If the later payment card expiration date is delivered only to the acquirer 2322 by payment network server system 2202, acquirer 2322 may present the later expiration date to the merchant proactively, or upon request by the merchant. In other embodiments, rather than providing the later expiration date to merchant 2336 in any of the ways discussed above, payment network server 2202 instead includes an indicator in the authorization response message indicating that merchant 2336 should contact the cardholder to obtain the later payment card expiration date.

In one aspect, a method for processing a card-not-present account-on-file transaction over a computer device coupled to a database is provided. The card-not-present account-on-file transaction has a first transaction date. The transaction is made by a cardholder using payment card information stored by a merchant. The payment card information includes a payment card number. The method includes receiving a first authorization request message for the transaction, the first authorization request message received at the computer device from an acquirer associated with the merchant. The method further includes determining that the first authorization request message is associated with a card-not-present account-on-file transaction based on a first flag present in the first authorization request message. The method further includes identifying a first expiration date included in the authorization request message for the payment card number used for the transaction. The method further includes querying the database to determine if a second expiration date associated with the payment card number is stored therein, the second expiration date being later than the first expiration date. The method further includes modifying the authorization request message at the computer device by replacing the first expiration date with the second expiration date. The method further includes transmitting the authorization request message to an issuer associated with the payment card.

The method may further include determining that the first expiration date is earlier than or equal to the first transaction date.

The method may further include transmitting the second expiration date to at least one of the merchant and the acquirer.

The method may further include: receiving an authorization response message from the issuer; modifying the authorization response message to include the second expiration date or an indicator that the merchant should contact the cardholder for the second expiration date; and transmitting the authorization response message to the acquirer.

The method may further be modified such that the transaction is a first transaction, the merchant is one of a first merchant and a second merchant, and the acquirer is one of a first acquirer and a second acquirer, wherein the method further comprises: receiving a second authorization request message for a second transaction having a second transaction date, the second authorization request message received at the computer device from the acquirer associated with the merchant; determining that the second authorization request message is associated with a card present transaction based on a second flag included in the second authorization request message; identifying a third expiration date for the payment card number, the third expiration date included in the second authorization request message; storing the third expiration date for the payment card number in the database.

The above method may be modified such that the second transaction occurs before the first transaction.

The above method may further include transmitting the second authorization request message to the issuer; receiving an authorization response message from the issuer; determining that the authorization response message includes an indication that the third expiration date is incorrect or outdated; and deleting the third expiration date from the database coupled to the payment network.

In another aspect, a network-based system for processing a card-not-present account-on-file transaction having a first transaction date is provided. The transaction is made by a cardholder using payment card information stored by a merchant. The payment card information includes a payment card number. The system includes a payment network, a payment database for storing information for the payment card, and a payment network server, wherein said payment network communicatively couples the payment database with the payment network server. The payment network server is configured to receive a first authorization request message for the transaction, the first authorization request message received from an acquirer associated with the merchant. The payment network server is further configured to determine that the first authorization request message is associated with a card-not-present account-on-file transaction based on a first flag present in the first authorization request message. The payment network server is further configured to identify a first expiration date included in the authorization request message for the payment card number used for the transaction. The payment network server is further configured to query the payment database to determine if a second expiration date associated with the payment card number is stored therein, the second expiration date being later than the first expiration date. The payment network server is further configured to modify the authorization request message by replacing the first expiration date with the second expiration date. The payment network server is further configured to transmit the authorization request message to an issuer associated with the payment card.

The system may be modified such that said payment network server is further configured to determine that the first expiration date is earlier or equal to the first transaction date.

The system may be modified such that said payment network server is further configured to transmit the second expiration date to at least one of the merchant and the acquirer.

The system may be modified such that said payment network server is further configured to: receive an authorization response message from the issuer; modify the authorization response message to include the second expiration date or an indicator that the merchant should contact the cardholder for the second expiration date; and transmit the authorization response message to the acquirer.

The system may be modified such that the transaction is a first transaction, the merchant is one of a first merchant and a second merchant, the acquirer is one of a first acquirer and a second acquirer, and the payment network server is further configured to: receive a second authorization request message for a second transaction having a second transaction date, the second authorization request message received from the acquirer associated with the merchant; determine that the second authorization request message is associated with a card present transaction based on a second flag included in the second authorization request message; identify a third expiration date for the payment card number, the third expiration date included in the second authorization request message; store the third expiration date for the payment card number in said payment database.

The above system may be modified such that the second transaction occurs before the first transaction.

The system may further be modified such that the payment network server is further configured to: transmit the second authorization request message to the issuer; receive an authorization response message from the issuer; determine that the authorization response message includes an indication that the third expiration date is incorrect or outdated; and delete the third expiration date from said payment database.

In a further aspect, a computer coupled to a database for processing a card-not-present account-on-file transaction having a first transaction date is provided. The transaction is made by a cardholder using payment card information stored by a merchant. The payment card information includes a payment card number. The computer is programmed to receive a first authorization request message for the transaction, the first authorization request message received from an acquirer associated with the merchant. The computer is further programmed to determine that the first authorization request message is associated with a card-not-present account-on-file transaction based on a first flag present in the first authorization request message. The computer is further programmed to identify a first expiration date included in the authorization request message for the payment card number used for the transaction. The computer is further programmed to query the database to determine if a second expiration date associated with the payment card number is stored therein, the second expiration date being later than the first expiration date. The computer is further programmed to modify the authorization request message by replacing the first expiration date with the second expiration date. The computer is further programmed to transmit the authorization request message to an issuer associated with the payment card.

The computer may be further programmed to determine that the first expiration date is earlier or equal to the first transaction date.

The computer may be further programmed to transmit the second expiration date to at least one of the merchant and the acquirer.

The computer may be further programmed to: receive an authorization response message from the issuer, modify the authorization response message to include the second expiration date or an indicator that the merchant should contact the cardholder for the second expiration date; and transmit the authorization response message to the acquirer.

The computer may be further programmed to perform the process discussed above, wherein the transaction is a first transaction, the merchant is one of a first merchant and a second merchant, and the acquirer is one of a first acquirer and a second acquirer, wherein said computer is further programmed to: receive a second authorization request message for a second transaction having a second transaction date, the second authorization request message received from the acquirer associated with the merchant; determine that the second authorization request message is associated with a card present transaction based on a second flag included in the second authorization request message; identify a third expiration date for the payment card number, the third expiration date included in the second authorization request message; store the third expiration date for the payment card number in the database.

The computer may be further programmed to perform the process described above, wherein the second transaction occurs before the first transaction.

The computer may be further programmed to: transmit the second authorization request message to the issuer; receive an authorization response message from the issuer; determine that the authorization response message includes an indication that the third expiration date is incorrect or outdated; and delete the third expiration date from the database.

In yet another aspect, a non-transitory computer readable storage medium storing computer-executable instructions thereon for processing a card-not-present account-on-file transaction having a first transaction date is provided. The transaction is made by a cardholder using payment card information stored by a merchant. The payment card information includes a payment card number. When executed by a computer coupled to a database, the computer-executable instructions cause the computer to receive a first authorization request message for the transaction, the first authorization request message received from an acquirer associated with the merchant. The computer-executable instructions further cause the computer to determine that the first authorization request message is associated with a card-not-present account-on-file transaction based on a first flag present in the first authorization request message. The computer-executable instructions further cause the computer to identify a first expiration date included in the authorization request message for the payment card number used for the transaction. The computer-executable instructions further cause the computer to query the database to determine if a second expiration date associated with the payment card number is stored therein, the second expiration date being later than the first expiration date. The computer-executable instructions further cause the computer to modify the authorization request message by replacing the first expiration date with the second expiration date. The computer-executable instructions further cause the computer to transmit the authorization request message to an issuer associated with the payment card.

The computer-executable instructions may further cause the computer to determine that the first expiration date is earlier or equal to the first transaction date.

The computer-executable instructions may further cause the computer to transmit the second expiration date to at least one of the merchant and the acquirer.

The computer-executable instructions may further cause the computer to carry out the process described above, wherein the merchant is one of a first merchant and a second merchant, the acquirer is one of a first acquirer and a second acquirer, and wherein said computer-executable instructions further cause the computer to: receive a second authorization request message for a second transaction having a second transaction date, the second authorization request message received from the acquirer associated with the merchant; determine that the second authorization request message is associated with a card present transaction based on a second flag included in the second authorization request message; identify a third expiration date for the payment card number, the third expiration date included in the second authorization request message; store the third expiration date for the payment card number in the database.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for automatically pushing updated data from a first database to a second database to cause the second database to be synchronized with the first database, the first and second databases synchronized to process a card-not-present account-on-file transaction made by a cardholder using payment card information stored by a merchant in the second database, the method is performed using a payment network computer device coupled to the first database, the payment card information including a payment card account identifier, said method comprising:
   receiving, by the payment network computer device, an authorization request message for the transaction, the authorization request message received at the payment network computer device from an acquirer associated with the merchant;
   receiving, by the payment network computer device, an authorization response message, the authorization response message received at the computer device from an issuer, the authorization response including a denial indicator indicating that the transaction has been denied;
   querying, by the payment network computer device, the first database, based on a denial code included within the denial indicator received directly from the issuer, to determine whether the first database includes updated payment card information associated with the payment card account identifier associated with the transaction;
   generating an updated payment card information data file that includes the updated payment card information, a transaction date associated with the transaction, a purchase amount for the transaction, and a merchant identifier that identifies the merchant; and
   transmitting, by the payment network computer device, the updated payment card information data file to the acquirer for the acquirer to communicate to the merchant, causing the second database to be updated to include the information in the updated payment card information data file, and prompting the merchant to resubmit the transaction using the information in the updated payment card information data file to complete the transaction.

2. A method in accordance with claim 1, wherein transmitting the updated payment card information data file comprises automatically transmitting the updated payment card information data file to the acquirer in response to detecting the denial indicator at the payment network computer device and without the acquirer requesting the updated payment card information data file.

3. A method in accordance with claim 1, further comprising:
   storing, in the first database, the authorization response and denial indicator.

4. A method in accordance with claim 1, wherein receiving an authorization response message further comprises receiving an authorization response message including a denial indicator indicating that a card number associated with the authorization request is incorrect.

5. A method in accordance with claim 1, wherein receiving an authorization response message further comprises receiving an authorization response message including a denial indicator indicating that a card expiration date associated with the authorization request is incorrect.

6. A method in accordance with claim 1, wherein querying the first database to determine whether the first database includes updated payment card information includes determining whether an updated payment card number is stored in the first database associated with the payment card account identifier associated with the transaction.

7. A method in accordance with claim 1, wherein querying the first database to determine whether the first database includes updated payment card information includes determining whether an updated expiration date is stored in the first database associated with the payment card account identifier associated with the transaction.

8. A method in accordance with claim 1, wherein querying the first database to determine whether the first database includes updated payment card information includes determining whether an account cancellation flag is stored in the first database associated with the payment card account identifier associated with the transaction.

9. A method in accordance with claim 1, wherein transmitting the updated payment card information data file is performed upon receiving a request from the acquirer for information regarding denied payment transactions.

10. A method in accordance with claim 9, wherein receiving the request from the acquirer for information regarding denied transactions comprises:
   receiving user credentials from the acquirer at a website operated by a web server communicatively coupled to the payment network computer device;
   authenticating the acquirer by the payment network computer device based on the received user credentials; and causing the information in the updated payment card information data file to be displayed to the authenticated acquirer on the website.

11. A network-based system for automatically pushing updated data from a payment database to a merchant database to cause the merchant database to by synchronized with the payment database, the payment and merchant databases synchronized to process a card-not-present account-on-file transaction made by a cardholder using payment card information stored by a merchant in the merchant database, the payment card information including a payment card account identifier, said system comprising:
  a payment network;
  a payment database for storing updated information associated with the payment card account identifier; and
  a payment network server, wherein said payment network communicatively couples said payment database with said payment network server, and wherein said payment network server is configured to:
  receive a first authorization request message for the transaction, the first authorization request received from an acquirer computer;
  receive an authorization response message, the authorization response message received from an issuer, the authorization response including a denial indicator indicating that the transaction has been denied;
  query said payment database, based on a denial code included within the denial indicator received directly from the issuer, to determine whether said payment database includes updated payment card information for the payment card account identifier associated with the transaction;
  generate an updated payment card information data file that includes the updated payment card information, a transaction date associated with the transaction, a purchase amount for the transaction, and a merchant identifier that identifies the merchant; and
  transmit the updated payment card information date file to the acquirer computer for the acquirer computer to communicate to the merchant computer, causing the merchant database to be updated to include the information in the updated payment card information data file, and prompting the merchant to resubmit the transaction using the information in the updated payment card information data file to complete transaction.

12. A system in accordance with claim 11, wherein said payment network server is further configured to identify the authorization request message as relating to a card-not-present account-on-file transaction.

13. A system in accordance with claim 11, wherein said payment network server is further configured to store, in said payment database, the authorization response and denial indicator.

14. A system in accordance with claim 11, wherein said payment network server is further configured to query said payment database to determine whether said payment database includes at least one of:
  an updated payment card number associated with the payment card account identifier associated with the transaction;
  an updated expiration date associated with the payment card account identifier associated with the transaction; and
  an account cancelation flag associated with the payment card account identifier associated with the transaction.

15. A system in accordance with claim 11, wherein the payment network server is further configured to identify whether the denial indicator indicates that a card number associated with the authorization request is incorrect or that an expiration date associated with the authorization request is incorrect.

16. A system in accordance with claim 11, wherein the payment network server is further configured to transmit the updated payment card information data file to the acquirer computer upon authenticating the acquirer computer to said payment network server.

17. A payment network computer for automatically pushing updated data from a first database to a second database to cause the second database to be synchronized with the first database, the first and second databases synchronized to process a card-not-present account-on-file transaction made by a cardholder using payment card information stored by a merchant in the second database, the payment card information including a payment card account identifier, said computer programmed to:
  receive an authorization request message for the transaction, the authorization request message received from an acquirer associated with the merchant;
  receive an authorization response message, the authorization response message received from an issuer, the authorization response including a denial indicator indicating that the transaction has been denied;
  query the first database, based on a denial code included within the denial indicator received directly from the issuer, to determine whether the first database includes updated payment card information for a payment card account identifier associated with the transaction;
  generate an updated payment card information data file that includes the updated payment card information, a transaction date associated with the transaction, a purchase amount for the transaction, and a merchant identifier that identifies the merchant; and
  transmit the updated payment card information data file to the acquirer for the acquirer to communicate to the merchant, causing the second database to be updated to include the information in the updated payment card information data file, and prompting the merchant to resubmit the transaction using the information in the updated payment card information data file to complete the transaction.

18. A computer in accordance with claim 17, wherein said computer is further programmed to identify the authorization request message as relating to a card-not-present account-on-file transaction based on a card-not-present account-on-file flag in the authorization request message.

19. A computer in accordance with claim 17, wherein said computer is further programmed to store in the first database the authorization response and denial indicator.

20. A computer in accordance with claim 17, wherein said computer is further programmed to query the first database to determine whether the first database includes at least one of:
  an updated payment card number associated with the payment card account identifier associated with the transaction;
  an updated expiration date associated with the payment card account identifier associated with the transaction; and
  an account cancelation flag associated with the payment card account identifier associated with the transaction.

21. A computer in accordance with claim 17, wherein said computer is further programmed to identify whether the denial indicator indicates that a card number associated with the authorization request is incorrect or that an expiration date associated with the authorization request is incorrect.

22. A non-transitory computer readable storage medium storing computer-executable instructions thereon for automatically pushing updated data from a first database to a second database to cause the second database to be synchronized with the first database, the first and second databases synchronized to process a card-not-present account-on-file transaction made by a cardholder using payment card information stored by a merchant in the second database, the payment card information including a payment card account identifier, wherein when executed by a payment network computer coupled to the first database, causes the payment network computer to:

receive an authorization request message for the transaction, the authorization request message received from an acquirer associated with the merchant;

receive an authorization response message, the authorization response message received from an issuer, the authorization response including a denial indicator indicating that the transaction has been denied;

query the first database, based on a denial code included within the denial indicator received directly from the issuer, to determine whether the first database includes updated payment card information for a payment card account identifier associated with the transaction;

generate an updated payment card information data file that includes the updated payment card information, a transaction date associated with the transaction, a purchase amount for the transaction, and a merchant identifier that identifies the merchant; and transmit the updated payment card information data file to the acquirer for the acquirer to communicate to the merchant, causing the second database to be updated to include the information in the updated payment card information data file, and prompting the merchant to resubmit the transaction using the information in the updated payment card information data file to complete the transaction.

23. The non-transitory computer readable storage medium in accordance with claim 22, wherein said computer-executable instructions further cause the computer to store in the first database the authorization response and denial indicator.

24. The non-transitory computer readable storage medium in accordance with claim 22, wherein said computer-executable instructions further cause the computer to query the first database to determine whether the first database includes at least one of:

an updated payment card number associated with the payment card account identifier associated with the transaction;

an updated expiration date associated with the payment card account identifier associated with the transaction; and an account cancelation flag associated with the payment card account identifier associated with the transaction.

25. The non-transitory computer readable storage medium in accordance with claim 22, wherein said computer-executable instructions further cause the computer to transmit the updated payment card information data file to the acquirer upon receiving a request from the acquirer for information regarding denied payment transactions.

\* \* \* \* \*